US012627207B2

(12) United States Patent
Esakki et al.

(10) Patent No.: US 12,627,207 B2
(45) Date of Patent: May 12, 2026

(54) ROTARY POSITION SENSOR

(71) Applicant: HONEYWELL INTERNATIONAL INC., Charlotte, NC (US)

(72) Inventors: Subramanian Esakki, Charlotte, NC (US); John Jerred, Charlotte, NC (US); Stephen Tillotson, Charlotte, NC (US); Paresh Sanchihar, Charlotte, NC (US); Vijayshekhar Araganji, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 596 days.

(21) Appl. No.: 18/048,288

(22) Filed: Oct. 20, 2022

(65) Prior Publication Data

US 2023/0147074 A1 May 11, 2023

(30) Foreign Application Priority Data

Nov. 8, 2021 (IN) .............................. 202111051058

(51) Int. Cl.
*H02K 29/08* (2006.01)
*H02K 11/215* (2016.01)

(52) U.S. Cl.
CPC ........... *H02K 29/08* (2013.01); *H02K 11/215* (2016.01)

(58) Field of Classification Search
CPC ...... H02K 11/20; H02K 11/21; H02K 11/215; H02K 29/06; H02K 29/08; G01D 5/12; G01D 5/14; G01D 5/16; G01D 5/20; G01D 5/204; G01D 5/2046; G01D 5/22; G01D 5/2291
See application file for complete search history.

(56) References Cited

U.S. PATENT DOCUMENTS 7,199,691 B2    4/2007  Miya
10,308,230 B2   6/2019  Tada
2009/0179632 A1  7/2009  Nishiguchi et al.
(Continued)

FOREIGN PATENT DOCUMENTS

DE      102016202859 B3    6/2017
DE      102016202877 B3    6/2017
(Continued)

OTHER PUBLICATIONS

European search report Mailed on Oct. 28, 2024 for EP Application No. 24188986, 8 page(s).
European search report Mailed on Mar. 16, 2023 for EP Application No. 22203086.
Decision to grant a European patent Mailed on Jun. 27, 2024 for EP Application No. 22203086, 2 page(s).
Cambridge Integrated Circuits Ltd., Resonant Inductive Sensing vs Resolvers, Document No. 033-0074_0003, 7 pgs., (2019).
(Continued)

*Primary Examiner* — Huy Q Phan
*Assistant Examiner* — David B Frederiksen
(74) *Attorney, Agent, or Firm* — Alston & Bird LLP

(57) ABSTRACT

Apparatuses, systems, and methods for sensing rotary positions are provided. For example, an example rotary position sensor includes a rotor assembly having a rotor assembly opening for securing the rotor assembly to a shaft structure, a stator assembly having a stator assembly opening for receiving the shaft structure, and a base assembly secured to the stator assembly. In some examples, the base assembly (such as, but not limited to, a PCB assembly) comprises a plurality of primary coil elements printed on a first side of the base assembly and a plurality of secondary coil elements printed on a second side of the base assembly.

20 Claims, 14 Drawing Sheets

(56)                    References Cited

U.S. PATENT DOCUMENTS

2009/0309584 A1* 12/2009 Nehl ..................... G01D 5/2033
                                                          324/164
2010/0156401 A1*  6/2010 Nishiguchi ............ G01D 5/208
                                                          324/207.25
2010/0194251 A1*  8/2010 Sikes ..................... H02K 21/24
                                                          310/156.37
2010/0321007 A1  12/2010 Fukuda et al.
2013/0175894 A1*  7/2013 Chen ..................... H02K 21/24
                                                          310/114
2015/0084446 A1*  3/2015 Atar ..................... H02K 11/215
                                                          310/43
2018/0278133 A1*  9/2018 Blevins .................. H02K 5/225
2018/0329275 A1* 11/2018 Endo ..................... H04N 23/687
2019/0013712 A1*  1/2019 Kim ......................... H02K 3/26
2019/0017845 A1*  1/2019 Utermoehlen ........ G01D 5/2053
2019/0072414 A1   3/2019 Utermoehlen et al.
2020/0059139 A1*  2/2020 Li ........................... H02K 15/50
2020/0247353 A1*  8/2020 Specht ................... B60R 22/34
2021/0218322 A1*  7/2021 Mihaila ................. H02K 5/203

2021/0310830 A1* 10/2021 Park ..................... G01D 5/2093

FOREIGN PATENT DOCUMENTS

EP          1966874 A2      9/2008
EP          2005563 A1     12/2008
JP          4654366 B2      3/2011
WO     2007/119142 A1     10/2007

OTHER PUBLICATIONS

Mühlbeyer GmbH , "Welcome. What can we do for you?", 4 pgs,
[Retrieved from the Internet Nov. 2, 2022: <URL: http://https://
www.muehlbeyer.de/files/docs/muehlbeyer-plastic-coated-stators.
pdf>], (2022).
Communication about intention to grant a European patent Mailed
on Feb. 21, 2024 for EP Application No. 22203086, 6 page(s).
EP Office Action Mailed on Mar. 5, 2026 for EP Application No.
24188986, 4 page(s).

* cited by examiner

200

210A

208

202

204

206A

212A

212B

210B

210C

ERROR

ROTARY POSITION SENSOR

CROSS-REFERENCE TO RELATED APPLICATIONS

This application claims priority pursuant to 35 U.S.C. 119(a) to Indian Application No. 202111051058, filed Nov. 8, 2021, which application is incorporated herein by reference in its entirety.

FIELD OF THE INVENTION

Example embodiments of the present disclosure relate generally to position sensing devices and systems and, more particularly, to configurable systems and apparatuses that sense rotary positions and provide quadrature sinusoidal outputs and/or quadrant linear outputs.

BACKGROUND

Applicant has identified many technical challenges and difficulties associated with sensors. For example, many sensors require complex processes to manufacture, skilled labor to operate and/or high cost to maintain, therefore limiting their applicability and/or accuracy.

BRIEF SUMMARY

Various embodiments described herein relate to methods, apparatuses, and systems for sensing rotary position. In particular, various embodiments provides a configurable rotary position sensor that provide quadrature sinusoidal outputs as a resolver and/or quadrant linear outputs as a rotary variable differential transformer (RVDT) based on, for example but not limited to, the number of primary coil elements, the number of secondary coil elements, the number of stator plates, and/or the number of rotor plates of the rotary position sensor.

In accordance with various embodiments of the present disclosure, a rotary position sensor is provided. In some embodiments, the rotary position sensor comprises a rotor assembly comprising a rotor assembly opening for securing the rotor assembly to a shaft structure; a stator assembly comprising a stator assembly opening for receiving the shaft structure; and a base assembly secured to the stator assembly. In some embodiments, the base assembly secured to the stator assembly is a printed circuit board (PCB) assembly. In some embodiments, the base assembly secured to the stator assembly is not a PCB assembly (for example, an assembly in the form of a substrate, a frame, and/or the like).

In some embodiments, the base assembly (such as, but not limited to, the PCB assembly) comprises a plurality of primary coil elements printed on a first side of the base assembly (such as, but not limited to, the PCB assembly) and a plurality of secondary coil elements printed on a second side of the base assembly (such as, but not limited to, the PCB assembly).

In some embodiments, the PCB assembly comprises a PCB assembly opening. In some embodiments, the PCB assembly opening is aligned with the stator assembly opening.

In some embodiments, a secondary coil element number associated with the plurality of secondary coil elements is twice a primary coil element number associated with the plurality of primary coil elements.

In some embodiments, the PCB assembly comprises at least two primary coil elements printed on a first side of the PCB assembly and at least four secondary coil elements printed on a second side of the PCB assembly. In some embodiments, the side of the PCB assembly that the coil elements are on can be different from those described herein. For example, some embodiments of the present disclosure may implement other spatial arrangements (such as, but not limited to, two PCB assemblies).

In some embodiments, the primary coil element number corresponds to a resolver speed of the rotary position sensor.

In some embodiments, the plurality of primary coil elements are positioned radially away from the PCB assembly opening on the first side of the PCB assembly.

In some embodiments, a plurality of distances between a primary coil element center of each of the plurality of primary coil elements and a PCB assembly opening center of the PCB assembly opening are the same. In some embodiments, the radiuses of the plurality of primary coil elements are the same. In some embodiments, the radiuses of the plurality of primary coil elements are different.

In some embodiments, the plurality of primary coil elements are distributed equally along a distribution circumference on the PCB assembly.

In some embodiments, the plurality of secondary coil elements comprises a plurality of secondary coil A elements and a plurality of secondary coil B elements. In some embodiments, each of the plurality of secondary coil A elements is positioned at a 90 degrees angle to one of the plurality of secondary coil B elements relative to a PCB assembly opening center of the PCB assembly opening. In some embodiments, the rotary position sensor further comprises a differential voltage detecting element electronically coupled to one of the plurality of secondary coil A elements and one of the plurality of secondary coil B elements. In some embodiments, the differential voltage detecting element generates a differential voltage output indicating a voltage difference between the plurality of secondary coil A elements and the plurality of secondary coil B elements.

In some embodiments, the plurality of secondary coil elements comprises a plurality of sine coil elements and a plurality of cosine coil elements.

In some embodiments, each of the plurality of sine coil elements is positioned at a 90 degrees angle to one of the plurality of cosine coil elements relative to a PCB assembly opening center of the PCB assembly opening.

In some embodiments, the plurality of sine coil elements are electrically connected in series. In some embodiments, the plurality of cosine coil elements are electrically connected in series.

In some embodiments, the rotary position sensor further comprises a sine voltage detecting element electronically coupled to the plurality of sine coil elements and a cosine voltage detecting element electronically coupled to the plurality of cosine coil elements. In some embodiments, the sine voltage detecting element generates a sine voltage output indicating a sine voltage of the plurality of sine coil elements. In some embodiments, the cosine voltage detecting element generates a cosine voltage output indicating a cosine voltage of the plurality of cosine coil elements.

In some embodiments, the plurality of secondary coil elements are positioned radially away from the PCB assembly opening on the second side of the PCB assembly.

In some embodiments, a plurality of distances between a secondary coil element center of each of the plurality of secondary coil elements and a PCB assembly opening center of the PCB assembly opening are the same.

In some embodiments, the plurality of secondary coil elements are distributed equally along a distribution circumference on the PCB assembly.

In some embodiments, the rotor assembly comprises a plurality of rotor plates. In some embodiments, the stator assembly comprises a plurality of stator plates.

In some embodiments, a stator plate number associated with the plurality of stator plates is the same as a secondary coil element number associated with the plurality of secondary coil elements.

In some embodiments, the plurality of stator plates are in an annular sector shape and have the same size. In some embodiments, a stator sector angle of each of the plurality of stator plates is based on the stator plate number.

In some embodiments, each of the plurality of stator plates is separated from one another and is positioned to cover one of the plurality of secondary coil elements.

In some embodiments, a rotor plate number associated with the plurality of rotor plates is half of a stator plate number associated with the plurality of stator plates.

In some embodiments, the plurality of rotor plates are in an annular sector shape and have the same size. In some embodiments, a rotor sector angle of each of the plurality of rotor plates is based on the rotor plate number.

In some embodiments, the stator assembly comprises at least four stator plates. In some embodiments, the rotor assembly comprises at least two rotor plates.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1A:
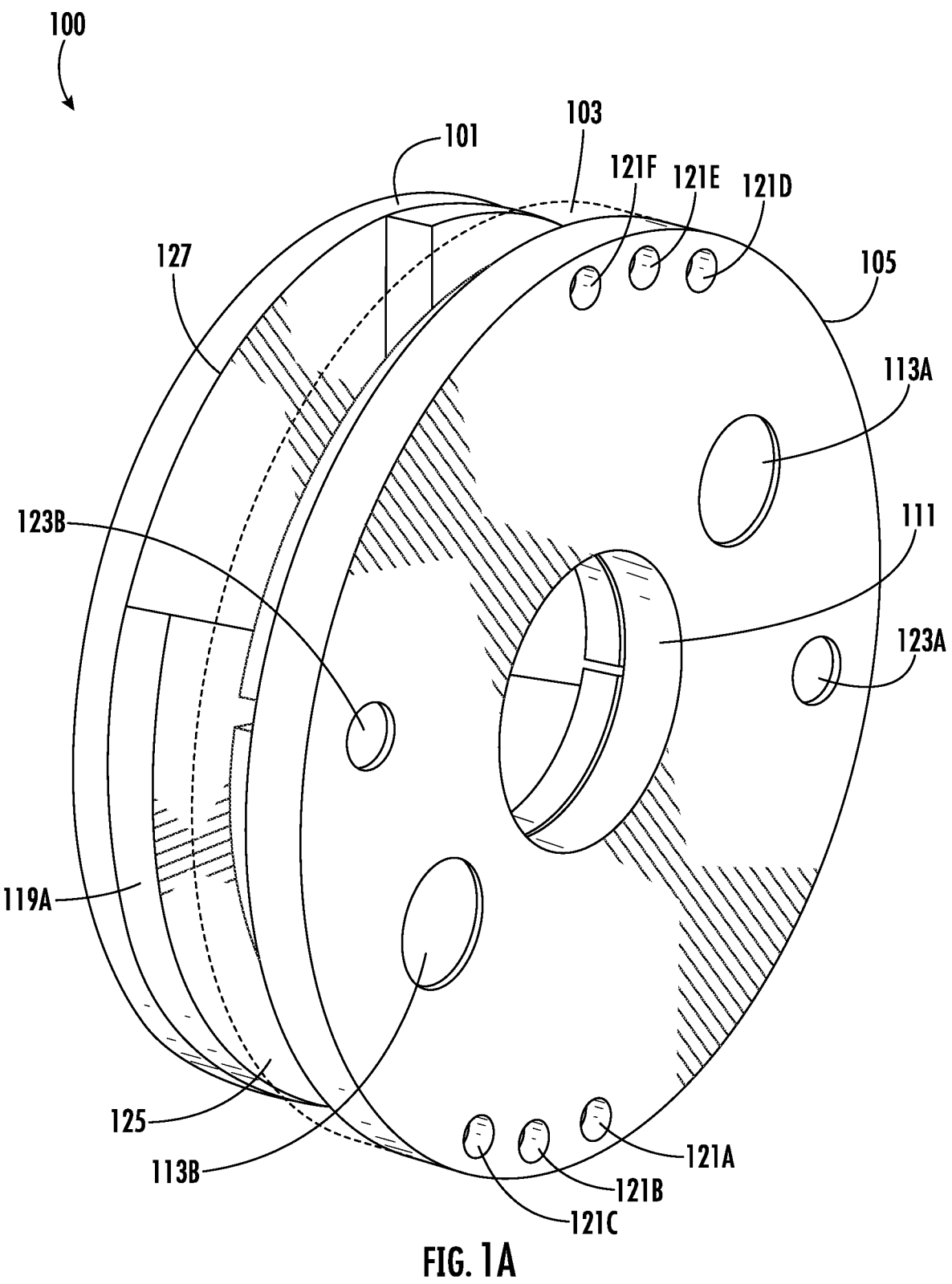
FIG. 1A illustrates an example perspective view of an example rotary position sensor in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

A rotary position sensor can measure displacement in a rotary fashion of an object (such as, but not limited to, the shaft of a motor) in either a clockwise or counterclockwise direction. Examples of rotary position sensors include, but not limited to, rotary variable differential transformers (RVDTs) and resolvers. In many applications, resolvers (such as variable reluctance (VR) resolvers) are preferred because of its through shaft construction and multi-speed options for motor commutation. Other sensors for measuring displacement in the rotary fashion include, but not limited to, magnetoresistive (MR) sensors, inductive sensors, and/or the like.

However, many rotary position sensors are faced by many technical challenges and difficulties. For example, many rotary position sensors have a high process and manufacturing cost due to complex designs. Many rotary position sensors require complex windings and manual/semi-automated processes to insert windings to the core for rotor and stator, which can lower the production yield rate. Many rotary position sensors require laminations for stator and rotor core, which is a tedious process. Many rotary position sensors also use grindings to avoid mis-alignment, which can be a tedious and costly process.

As an example, VR resolvers may require a complex manufacturing process and skilled labor to assemble, creating a high manufacturing cost. As another example, MR sensors may suffer from magnetic interference due to the placement of the magnet, which would require additional shielding at the system level. As another example, inductive sensors are integrated circuit (IC) based sensors that cannot operate at a high environmental temperature, therefore limiting the applicability of such sensors. As another example, many resolvers and RVDTs require complex process and skilled labor to manufacture, resulting in high cost and limited applicability due to its cost.

In contrast, various embodiments of the present disclosure overcome the above-referenced technical challenges and difficulties, and provide various technical advantages and benefits.

For example, various embodiments of the present disclosure provide example rotary position sensors that can function as axial flux-based printed circuit board (PCB) resolvers. In some embodiments, an example rotary position sensor comprises a PCB assembly that comprises at least two primary coil elements and at least four secondary coil elements (e.g. at least two sine coil elements and at least two cosine coil elements that are connected on a 90 degree phase). In some embodiments, an example rotary position sensor comprises a stator assembly that has at least four stator plates that comprise material with high magnetic permeability, which are inserted/molded into a stators shell that is secured to the PCB assembly. In some embodiments, an example rotary position sensor comprises a rotor assembly that comprises at least two rotor plates, which comprise material with high magnetic permeability and are disposed on a rotor flange. In some embodiments, the rotor assembly is fixed on a rotating shaft of a device, and the stator assembly is fixed to a body of the device.

In some embodiments, a configurable rotary position sensor may provide quadrature sinusoidal outputs as a resolver and/or quadrant linear outputs as a RVDT based on the number of primary coil elements, the number of secondary coil elements, the number of stator plates, and the number of rotor plates of the configurable rotary position sensor. For example, various embodiments of the present disclosure may change, for example, the rotor/stator assembly geometry, the placement and numbers of primary coil elements and secondary coil elements while providing a single design/solution that enables quadrature sinusoidal outputs as a resolver and/or quadrant linear outputs as a RVDT, details of which are described herein.

Additionally, or alternatively, various embodiments of the present disclosure eliminate the need for laminations on the rotor assembly and the stator assembly, thereby reducing cost and providing simplicity. Additionally, or alternatively, various embodiments of the present disclosure eliminate the need for physical poles and therefore improving simplicity and avoiding expensive manufacturing processes. Additionally, or alternatively, the primary coil elements and the secondary coil elements are printed on PCB assembly, therefore eliminating the error-prone and expensive process of assembling coils in RVDTs and VR resolvers (which require skilled labor and process cost).

Additionally, or alternatively, the primary coil elements and the secondary coil elements are printed on PCB assembly with an automated process so as to reduce cost. In particular, a PCB printed coil provides significant advantages with regards to avoidance of typical wound-component failure modes. Additionally, or alternatively, various embodiments of the present disclosure reduce the number of coils and coil ends for soldering in comparison with many RVDTs and VR resolvers that would require skilled labor and incur process cost. As described above, soldering lead wire to coil and binding lead wires are tedious processes that require skilled labor and process cost, and examples of the present disclosure may solder lead wires directly to the PCB assembly pins to lower the manufacturing cost.

Figure 1B:
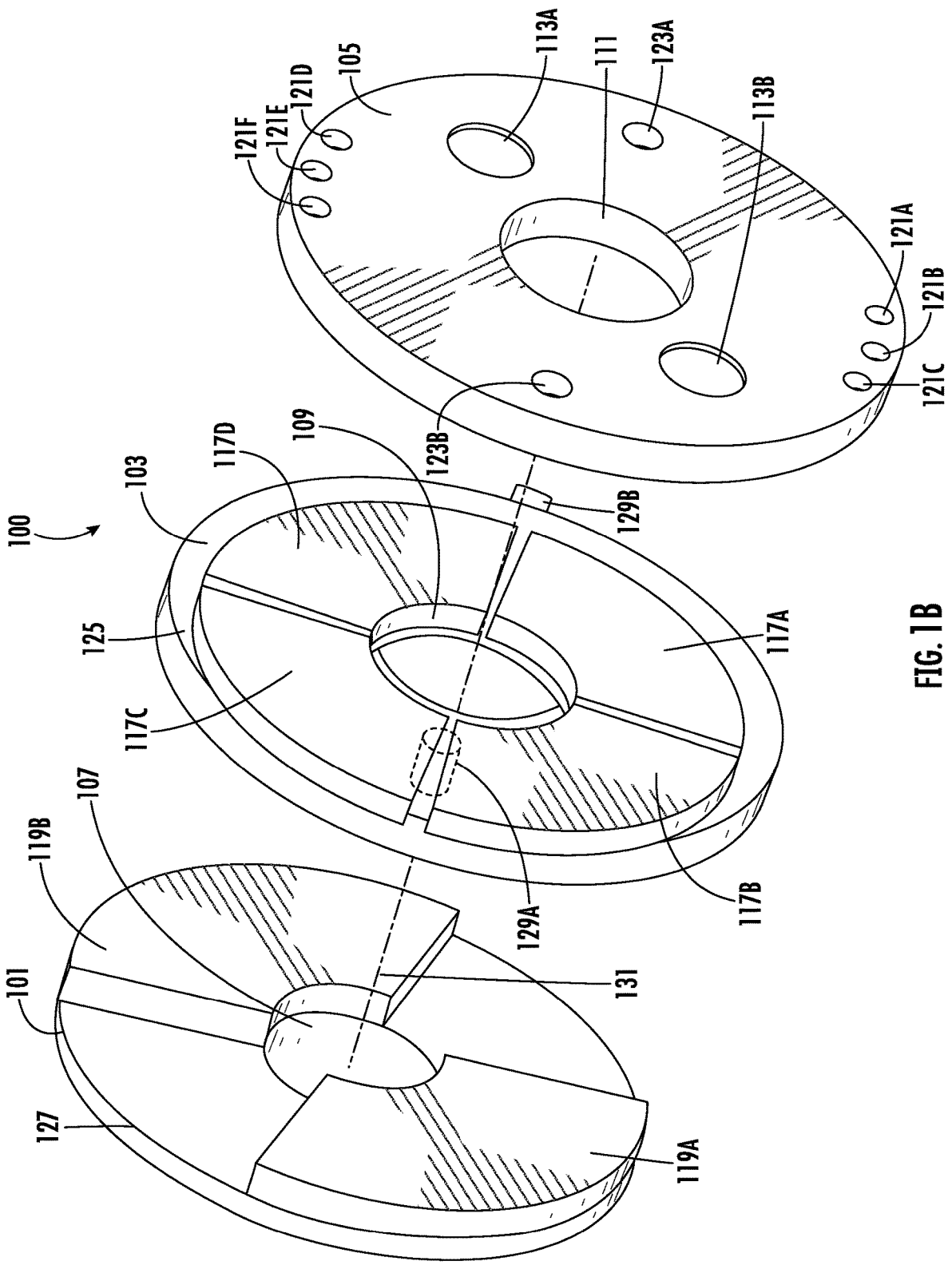
FIG. 1B illustrates an example of an exploded view of the example rotary position sensor shown in FIG. 1A in accordance with some example embodiments described herein.
Figure 1C:
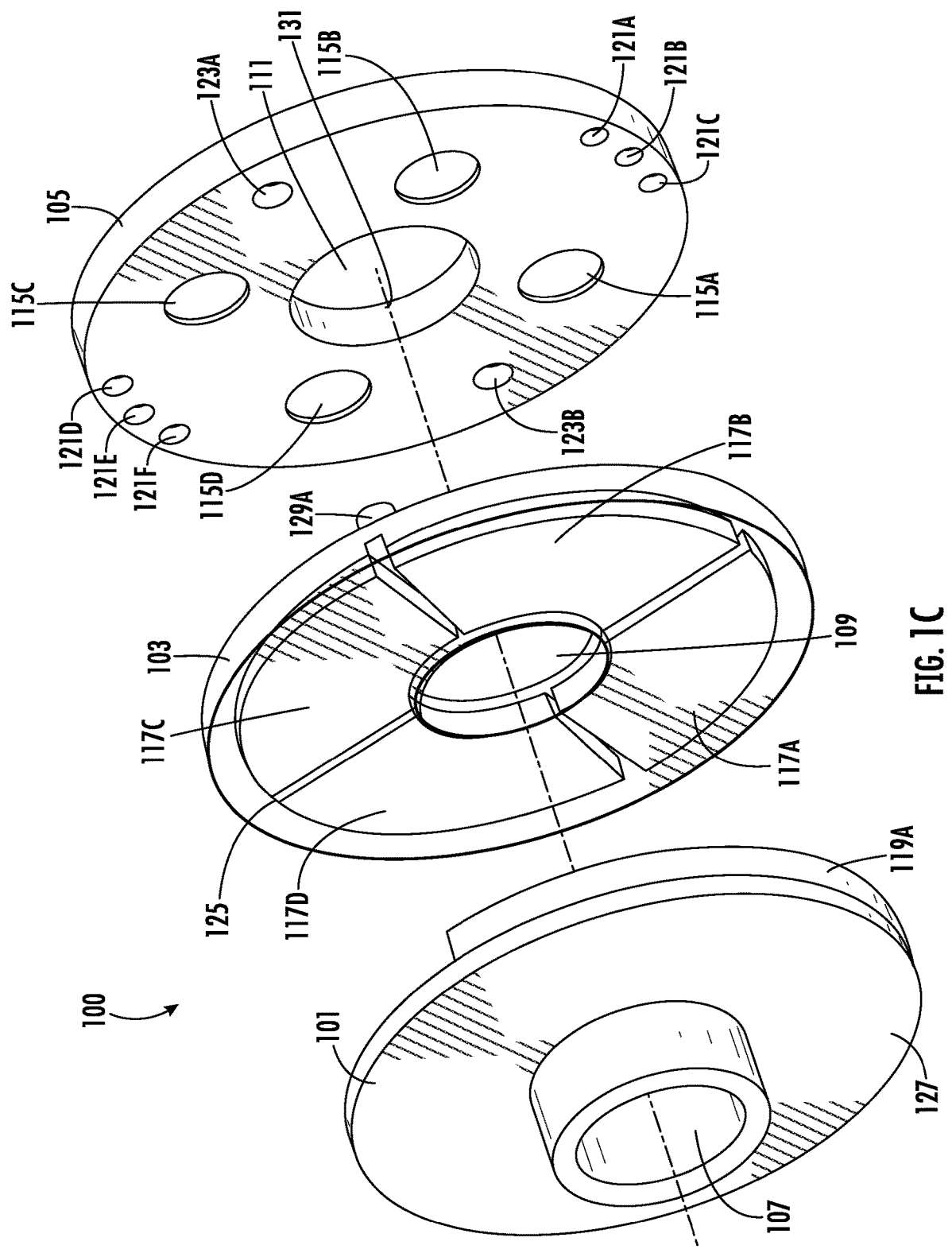
FIG. 1C illustrates another example of an exploded view of the example rotary position sensor shown in FIG. 1A in accordance with some example embodiments described herein.
Figure 1D:
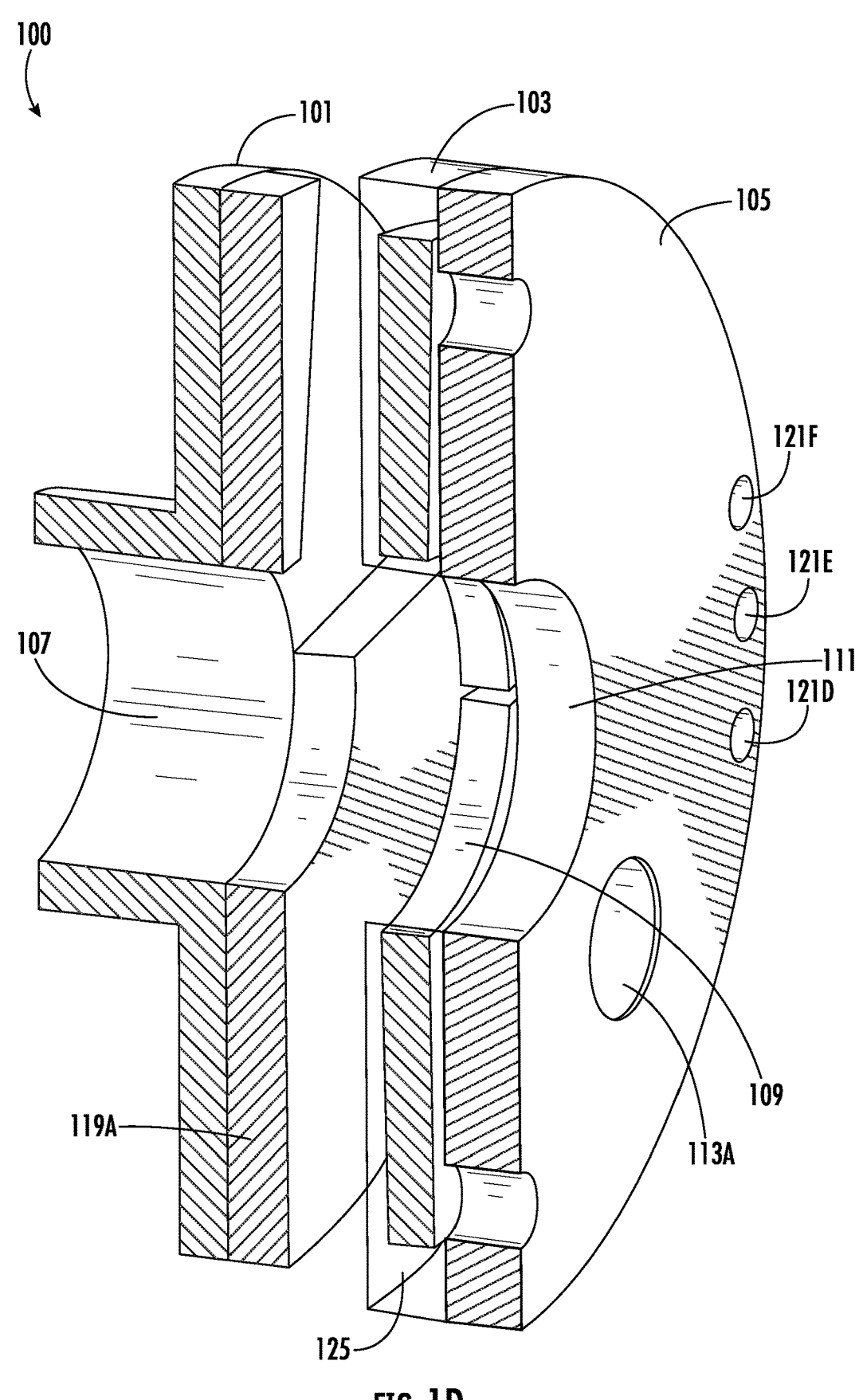
FIG. 1D illustrates an example angled cross-sectional view of the example rotary position sensor shown in FIG. 1A in accordance with some example embodiments described herein.
Figure 1E:
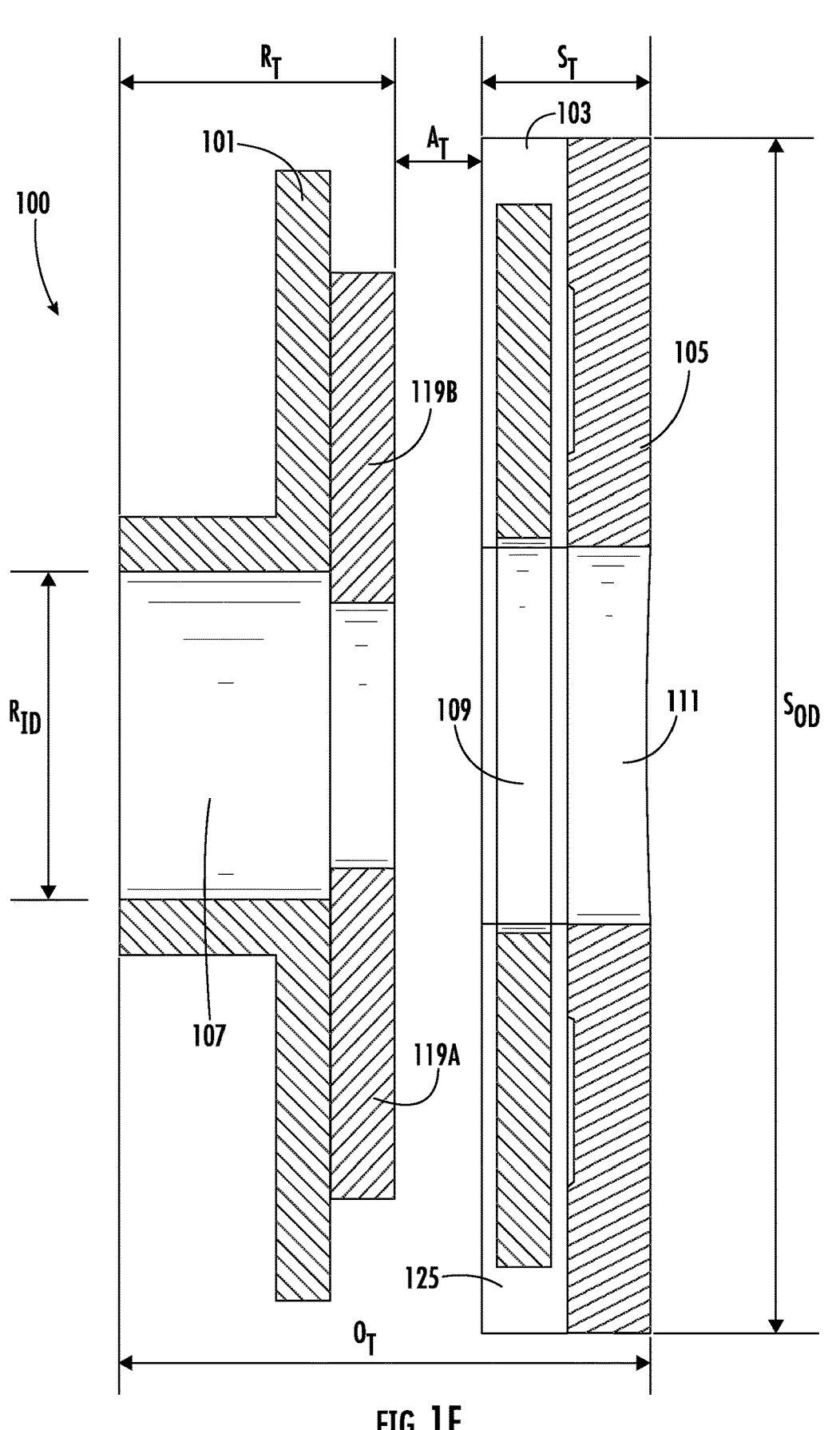
FIG. 1E illustrates an example cross-sectional view of the example rotary position sensor shown in FIG. 1A in accordance with some example embodiments described herein.

Referring now to FIG. 1A, FIG. 1B, FIG. 1C, FIG. 1D, and FIG. 1E, example views of an example rotary position sensor 100 in accordance with some example embodiments described herein are illustrated. In particular, FIG. 1A illustrates an example perspective view of the example rotary position sensor 100. FIG. 1B illustrates an example of an exploded view of the example rotary position sensor 100 shown in FIG. 1A. FIG. 1C illustrates another example of an exploded view of the example rotary position sensor 100 shown in FIG. 1A. FIG. 1D illustrates an example angled cross-sectional view of the example rotary position sensor 100 shown in FIG. 1A. FIG. 1E illustrates an example cross-sectional view of the example rotary position sensor 100 shown in FIG. 1A.

In the example shown in FIG. 1A to FIG. 1E, the example rotary position sensor 100 comprises a rotor assembly 101 and a stator assembly 103. In some embodiments, the example rotary position sensor 100 includes a base assembly. In the example shown in FIG. 1A to FIG. 1E, the base assembly is a printed circuit board (PCB) assembly 105.

In some embodiments, the PCB assembly 105 is in a shape that is similar to a ring shape. For example, the PCB assembly 105 comprises a PCB assembly opening 111 (for example, located at the center of the PCB assembly 105) for receiving a shaft structure. As described above, the example rotary position sensor 100 may be configured to detect an object's angular movement and translate the object's angular mechanical position to one or more electrical signals. In some embodiments, the shaft structure that is received by the PCB assembly opening 111 is the object whose angular movement is to be detected by the example rotary position sensor 100.

As an example, the example rotary position sensor 100 may be implemented to detect the rotary movement of a shaft of a motor. In such an example, the PCB assembly 105 may be secured to a housing of the motor directly (or indirectly through the stator assembly 103), and the PCB assembly opening 111 receives the shaft of the motor. The PCB assembly opening 111 may be in a circular shape, and the diameter of the PCB assembly opening 111 is larger than the diameter of the shaft of the motor, such that the shaft of the motor passes through the PCB assembly opening 111 and can rotate freely within the PCB assembly opening 111 without causing the PCB assembly 105 to rotate.

While the description above provides an example implementation of the example rotary position sensor 100, it is noted that the scope of the present disclosure is not limited to the description above. In some examples, an example rotary position sensor 100 may be implemented to detect the rotary position of other objects.

In some embodiments, the PCB assembly 105 provides a physical structure that includes one or more layers (such as, but not limited to, one or more conductive layers, one or more insulating layers, and/or the like). For example, the PCB assembly 105 comprises non-conductive substrate materials with layers of copper circuitry buried internally or on the external layers. In some embodiments, the PCB assembly 105 secures or affixes one or more electronic components (including, but not limited to, one or more coil elements) on an external layer of the PCB assembly 105. In some embodiments, the PCB assembly 105 provides reliable electrical connections (as needed) between the one or more electronic components that are secured or affixed on the PCB assembly 105.

For example, the one or more coil elements may be "printed" on the outer layer of the PCB assembly 105. An example manufacturing method of printing the coil elements on the PCB assembly 105 may include printing the design(s) of one or more coil elements on a photo paper, attached the photo paper to a copper clad board to transfer the design(s) onto the copper clad board, and etching the copper clad board to dissolve portions of copper from the copper clad board that are not part of the design(s) of one or more coil elements. In some examples, one or more openings may be drilled on the PCB assembly 105 so as to connect the coil elements printed on the PCB assembly 105 to other more electronic components (for example, through one or more lead wires). Additionally, or alternatively, one or more electronic components may be soldered onto the PCB assembly 105.

In the present disclosure, the terms "coil element," "coil," and "electromagnetic coil" are used interchangeably to refer to an electrical conductor such as a wire in the shape of a coil, spiral or helix.

While the description above provides an example of printing coil elements on a PCB assembly, it is noted that the scope of the present disclosure is not limited to the description above. In some examples, coil elements may be printed on the PCB assembly 105 through other manufacturing means/methods such that the coil elements are secured or affixed on the PCB assembly 105. For example, while the use of a PCB provides many technical benefits, scope of the present disclosure is not limited to this example only. For example, example embodiments of the present disclosure may not implement a PCB at all while still providing various technical benefits described above, in that the coil geometry and stator/rotor geometry are simpler than many other designs.

Referring back to the example shown in FIG. 1A to FIG. 1E, in some embodiments, the PCB assembly 105 comprises a plurality of primary coil elements (such as, but not limited to, primary coil element 113A and primary coil element 113B) printed on a first side of the PCB assembly 105. In some embodiments, the PCB assembly 105 comprises a plurality of secondary coil elements (such as, but not limited to, secondary coil element 115A, secondary coil element 115B, secondary coil element 115C, and secondary coil element 115D) printed on a second side of the PCB assembly 105.

In some embodiments, the side(s) of the PCB assembly that the coil elements are on can be different from those described herein. For example, some embodiments of the present disclosure may implement other spatial arrangements for the coil elements and/or the PCB assemblies (such as, but not limited to, two PCB assemblies).

In some embodiments, the plurality of primary coil elements (such as, but not limited to, primary coil element 113A and primary coil element 113B) may be connected to an external power source (also referred to as an excitation voltage) through lead wires or terminals that pass through one or more of openings 121A, 121B, 121C, 121D, 121E, and 121F. For example, the external power source may provide an alternating current (AC) to the plurality of primary coil elements (for example, an AC in the sine wave form). In such an example, the plurality of primary coil elements may provide functions as primary windings of a transformer. For example, as the excitation voltage flows through the plurality of primary coil elements (such as, but not limited to, primary coil element 113A and primary coil element 113B), the plurality of primary coil elements (such as, but not limited to, primary coil element 113A and primary coil element 113B) generate a magnetic field (or "magnetic flux") around the plurality of primary coil elements. The strength and/or the direction of the magnetism (or magnetic flux density) fluctuates based on, for example but not limited to, the magnitude of the excitation voltage, the position of object having high magnetic permeability (such as, but not limited to, rotor plate 119A and rotor plate 119B described herein) that are in the magnetic field, and other factors.

Continuing from the example above, the plurality of secondary coil elements (such as, but not limited to, secondary coil element 115A, secondary coil element 115B, secondary coil element 115C, and secondary coil element 115D) may provide functions as secondary windings of the transformer. For example, the plurality of secondary coil elements (such as, but not limited to, secondary coil element 115A, secondary coil element 115B, secondary coil element 115C, and secondary coil element 115D) may be in the magnetic field generated by the plurality of primary coil elements (such as, but not limited to, primary coil element 113A and primary coil element 113B). As the strength and/or the direction of the magnetism fluctuates, electrical energy (also referred to as detection current or detection voltage) are generated/inducted in the plurality of secondary coil elements (such as, but not limited to, secondary coil element 115A, secondary coil element 115B, secondary coil element 115C, and secondary coil element 115D) due to electromagnetic induction.

In some embodiments, the voltages in the plurality of secondary coil elements (such as, but not limited to, secondary coil element 115A, secondary coil element 115B, secondary coil element 115C, and secondary coil element 115D) may correlate to the strength and/or the direction of the magnetism (or magnetic flux density) as detected by each of the plurality of secondary coil elements. As such, based on the voltages in the plurality of secondary coil elements (such as, but not limited to, secondary coil element 115A, secondary coil element 115B, secondary coil element 115C, and secondary coil element 115D), the strength and/or the direction of the magnetism (or magnetic flux density) may be calculated, which may in turn be used to infer, for example but not limited to, the positions of objects having high magnetic permeability (such as, but not limited to, rotor plate 119A and rotor plate 119B described herein) that are in the magnetic field. In some embodiments, the plurality of secondary coil elements (such as, but not limited to, secondary coil element 115A, secondary coil element 115B, secondary coil element 115C, and secondary coil element 115D) may be connected to one or more voltage detecting elements through lead wires or terminals that pass through one or more of openings 121A, 121B, 121C, 121D, 121E, and 121F.

In some embodiments, the plurality of primary coil elements (such as, but not limited to, primary coil element 113A and primary coil element 113B) are positioned radially away from the PCB assembly opening 111 on the first side of the PCB assembly 105. For example, as shown in at least FIG. 1B, the primary coil element 113A and primary coil element 113B are positioned radially away from the center of the PCB assembly opening 111.

In some embodiments, a plurality of distances between a primary coil element center of each of the plurality of primary coil elements (such as, but not limited to, primary coil element 113A and primary coil element 113B) and a PCB assembly opening center of the PCB assembly opening 111 are the same. For example, as shown in at least FIG. 1B, the distance between the primary coil element center of the primary coil element 113A and the PCB assembly opening center of the PCB assembly opening 111 is the same as the distance between the primary coil element center of the primary coil element 113B and the PCB assembly opening center of the PCB assembly opening 111.

In some embodiments, the radiuses of the plurality of primary coil elements are the same. In some embodiments, the radiuses of the plurality of primary coil elements are different. For example, an example rotary position sensor may comprise a first primary coil element that has a radius that is smaller than the radius for a second primary coil element so as to enable both one-speed outputs and multi-speed outputs from the same example rotary position sensor. In some embodiments, the plurality of primary coil elements (such as, but not limited to, primary coil element 113A and primary coil element 113B) are distributed equally along a distribution circumference on the PCB assembly 105. For example, as shown in at least FIG. 1B, the primary coil element 113A and the primary coil element 113B divide the distribution circumference on the PCB assembly 105 in halves.

In some embodiments, the plurality of secondary coil elements (such as, but not limited to, secondary coil element 115A, secondary coil element 115B, secondary coil element 115C, and secondary coil element 115D) are positioned radially away from the PCB assembly opening 111 on the second side of the PCB assembly 105. For example, as shown in at least FIG. 1C, the secondary coil element 115A, the secondary coil element 115B, the secondary coil element 115C, and the secondary coil element 115D are positioned radially away from the center of the PCB assembly opening 111.

In some embodiments, a plurality of distances between a secondary coil element center of each of the plurality of secondary coil elements (such as, but not limited to, secondary coil element 115A, secondary coil element 115B, secondary coil element 115C, and secondary coil element 115D) and a PCB assembly opening center (for example, a central axis 131 of the PCB assembly 105) of the PCB assembly opening 111 are the same. For example, as shown in at least FIG. 1C, the distance between the secondary coil element center of the secondary coil element 115A and the PCB assembly opening center of the PCB assembly opening 111, the distance between the secondary coil element center of the secondary coil element 115B and the PCB assembly opening center of the PCB assembly opening 111, the distance between the secondary coil element center of the secondary coil element 115C and the PCB assembly opening center of the PCB assembly opening 111, and the distance between the secondary coil element center of the secondary coil element 115D and the PCB assembly opening center of the PCB assembly opening 111 are all the same.

In some embodiments, the plurality of secondary coil elements (such as, but not limited to, secondary coil element 115A, secondary coil element 115B, secondary coil element 115C, and secondary coil element 115D) are distributed equally along a distribution circumference on the PCB assembly 105. For example, as shown in FIG. 1C, the secondary coil element 115A, the secondary coil element 115B, the secondary coil element 115C, and the secondary coil element 115D divide the distribution circumference on the PCB assembly 105 into quarters.

In some embodiments, the plurality of secondary coil elements (such as, but not limited to, secondary coil element 115A, secondary coil element 115B, secondary coil element 115C, and secondary coil element 115D) comprise a plurality of sine coil elements (such as, but not limited to, secondary coil element 115A and secondary coil element 115B) and a plurality of co sine coil elements (such as, but not limited to, secondary coil element 115D and secondary coil element 115C).

In some embodiments, each of the plurality of sine coil elements (such as, but not limited to, secondary coil element 115A and secondary coil element 115B) is positioned at a 90 degrees angle to one of the plurality of cosine coil elements (such as, but not limited to, secondary coil element 115D and secondary coil element 115C) relative to a PCB assembly opening center (for example, a central axis 131 of the PCB assembly 105) of the PCB assembly opening 111. For example, the secondary coil element 115A is a sine coil element that is positioned at a 90 degrees angle (relative to the central axis 131 of the PCB assembly 105) to the secondary coil element 115D that is a cosine coil element. As an example, the secondary coil element 115B is a sine coil element that is positioned at a 90 degrees angle (relative to the central axis 131 of the PCB assembly 105) to the secondary coil element 115C that is a cosine coil element.

In some embodiments, the plurality of sine coil elements (such as, but not limited to, secondary coil element 115A and secondary coil element 115B) are electrically connected in series. In some embodiments, the plurality of cosine coil elements (such as, but not limited to, secondary coil element 115D and secondary coil element 115C) are electrically connected in series. For example, the secondary coil element 115A and the secondary coil element 115B, which are sine coil elements, are connected in series. Additionally, or alternatively, the secondary coil element 115D and the secondary coil element 115C, which are cosine coil elements, are connected in series. In some embodiments, the plurality of sine coil elements (such as, but not limited to, secondary coil element 115A and secondary coil element 115B) may generate sine outputs. In some embodiments, the plurality of cosine coil elements (such as, but not limited to, secondary coil element 115D and secondary coil element 115C) may generate cosine outputs.

While the description above provides example outputs such as sine outputs and cosine outputs, it is noted that the scope of the present disclosure is not limited to the description above. For example, example outputs of the present disclosure may include, but are not limited to, synchro outputs, which has three equally spaced outputs rather than just sine outputs and cosine outputs.

In some embodiments, the primary coil element number associated with the plurality of primary coil elements and the secondary coil element number associated with the plurality of secondary coil elements may be configured or determined directly or indirectly based on output requirements of the example rotary position sensor 100, details of which are described herein.

In some embodiments, the PCB assembly 105 is secured to the stator assembly 103. In some embodiments, the stator assembly 103 is secured to the PCB assembly 105. In some embodiments, the PCB assembly 105 and the stator assembly 103 are secured to one another through a locking mechanism.

For example, as shown in FIG. 1B, an example locking mechanism comprising locking pins and locking openings are shown. For example, the stator assembly 103 comprises one or more locking pins (such as locking pin 129A and locking pin 129B) that protrude from an outer surface of the stator assembly 103. The PCB assembly 105 comprises one or more locking openings (such as locking opening 123A and locking opening 123B) that correspond to the one or more locking pins. In some embodiments, the one or more locking pins are disposed along a periphery of the stator assembly 103, and the one or more locking openings are disposed along a periphery of the PCB assembly 105. When the one or more locking pins of the stator assembly 103 are inserted to the one or more locking openings of the PCB assembly 105, the PCB assembly 105 and the stator assembly 103 are secured to one another.

While the description above provides an example of a locking mechanism, it is noted that the scope of the present disclosure is not limited to the description above. In some examples, an example locking mechanism may comprise one or more additional and/or alternative elements. In some embodiments, the PCB assembly 105 and the stator assembly 103 are secured to one another without a locking mechanism. For example, the stator assembly 103 may be attached to the PCB assembly 105 through chemical adhesive (such as glue).

Referring back to the example shown in FIG. 1A to FIG. 1E, in some embodiments, the stator assembly 103 is in a shape that is similar to a ring shape. For example, the stator assembly 103 comprises a stator assembly opening 109 (for example, located at the center of the stator assembly 103) for receiving a shaft structure. As described above, the example rotary position sensor 100 may be configured to detect an object's angular movement and translate the object's angular mechanical position to one or more electrical signals. In some embodiments, the shaft structure that is received by the stator assembly opening 109 is the object whose angular movement is to be detected by the example rotary position sensor 100.

As an example, the example rotary position sensor 100 may be implemented to detect the rotary movement of a shaft of a motor. In such an example, the stator assembly 103 may be secured to a housing of the motor directly (or indirectly through the PCB assembly 105), and the stator assembly opening 109 receives the shaft of the motor. The stator assembly opening 109 may be in a circular shape, and the diameter of the stator assembly opening 109 is larger than the diameter of the shaft of the motor, such that the shaft of the motor passes through the stator assembly opening 109 and can rotate freely within the stator assembly opening 109 without causing the stator assembly 103 to rotate.

While the description above provides an example implementation of the example rotary position sensor 100, it is noted that the scope of the present disclosure is not limited to the description above. In some examples, an example rotary position sensor 100 may be implemented to detect the rotary position of other objects.

In some embodiments, the PCB assembly opening 111 is aligned with the stator assembly opening 109. For example, the center axis of the PCB assembly opening 111 is aligned with the center axis of the stator assembly opening 109. In some embodiments, the diameter of the PCB assembly opening 111 is the same as the diameter of the stator assembly opening 109. In some embodiments, the diameter of the PCB assembly opening 111 is larger than the diameter of the stator assembly opening 109. In some embodiments, the diameter of the PCB assembly opening 111 is smaller than the diameter of the stator assembly opening 109.

Referring back to the example shown in FIG. 1A to FIG. 1E, in some embodiments, the stator assembly 103 comprises a stator shell 125.

In some embodiments, the stator shell 125 is in a ring shape. In some embodiments, the stator shell 125 comprises a stator shell opening (for example, located at the center of the stator shell 125) that provides the stator assembly opening 109. In some embodiments, the stator shell 125 may comprise one or more materials such as, but not limited to, plastics. In some embodiments, the stator shell 125 may comprise one or more materials other than plastic.

In some embodiments, the stator assembly 103 comprises a plurality of stator plates (such as, but not limited to, stator plate 117A, stator plate 117B, stator plate 117C, and stator plate 117D). In some embodiments, the plurality of stator plates (such as, but not limited to, stator plate 117A, stator plate 117B, stator plate 117C, and stator plate 117D) are disposed within the stator shell 125. For example, the plurality of stator plates (such as, but not limited to, stator plate 117A, stator plate 117B, stator plate 117C, and stator plate 117D) may be inserted or molded into the stator shell 125 such that the positions of the plurality of stator plates (such as, but not limited to, stator plate 117A, stator plate 117B, stator plate 117C, and stator plate 117D) are secured within the stator assembly 103.

In the example shown in FIG. 1B, the plurality of stator plates (such as, but not limited to, stator plate 117A, stator plate 117B, stator plate 117C, and stator plate 117D) are in an annular sector shape that is defined by at least an annular sector angle and the outer diameter and/or inner diameter of the stator plates. For example, the plurality of stator plates (such as, but not limited to, stator plate 117A, stator plate 117B, stator plate 117C, and stator plate 117D) may be annular sector plates. In some embodiments, the plurality of stator plates (such as, but not limited to, stator plate 117A, stator plate 117B, stator plate 117C, and stator plate 117D) have the same size.

In some embodiments, the plurality of stator plates (such as, but not limited to, stator plate 117A, stator plate 117B, stator plate 117C, and stator plate 117D) may provide technical benefits, improvements, and/or advantages such as, but not limited to, widening magnetic flux and/or reducing error.

For example, the plurality of stator plates (such as, but not limited to, stator plate 117A, stator plate 117B, stator plate 117C, and stator plate 117D) comprise material having a high magnetic permeability (e.g. the magnetic permeability of such material satisfies a magnetic permeability threshold). Examples of materials for stator plates that have a magnetic permeability satisfying a magnetic permeability threshold include, but not limited to, Carpenter HyMu "80"® Alloy, Carpenter 49® Alloy, and/or the like. The magnetic permeability of a stator plate indicates how easily an external magnetic field can induce an internal field in the stator plate. In other words, the higher the magnetic permeability, the better the stator plate at allowing magnetic flux to pass through it.

As described, the plurality of primary coil elements (such as, but not limited to, primary coil element 113A and primary coil element 113B) generates magnetic flux when excitation voltage is connected to the plurality of primary coil elements. In some embodiments, each of the plurality of stator plates (such as, but not limited to, stator plate 117A, stator plate 117B, stator plate 117C, and stator plate 117D) is separated from one another. In some embodiments, each of the plurality of stator plates (such as, but not limited to, stator plate 117A, stator plate 117B, stator plate 117C, and stator plate 117D) is positioned to cover or provide a cover for one of the plurality of secondary coil elements (such as, but not limited to, secondary coil element 115A, secondary coil element 115B, secondary coil element 115C, and secondary coil element 115D).

For example, the stator plate 117A is positioned to cover/provide a cover for secondary coil element 115A, the stator plate 117B is positioned to cover/provide a cover for secondary coil element 115B, the stator plate 117C is positioned to cover/provide a cover for secondary coil element 115C, and the stator plate 117D is positioned to cover/provide a cover for secondary coil element 115D. In some embodiments, a center of the stator plate overlaps with a center of the secondary coil element that it covers.

In some embodiments, at least because the plurality of stator plates comprise material(s) having high magnetic permeability, a stator plate of the plurality of stator plates can widen the magnetic flux received by the secondary coil element that is covered by the stator plate as the stator plate allows magnetic flux to pass through. Additionally, or alternatively, at least because the plurality of stator plates comprise material(s) having high magnetic permeability, a stator plate of the plurality of stator plates can reduce the amount of stray magnetic flux (that is not generated by the primary coil elements) from being detected by the secondary coil element that is covered by the stator plate so as to reduce error.

In some embodiments, the stator plate number associated with the plurality of stator plates, the stator sector angles of the stator plates, the outer diameter and/or inner diameter of the stator plates may be configured or determined directly or indirectly based on output requirements of the example rotary position sensor 100, details of which are described herein.

Referring back to the example shown in FIG. 1A to FIG. 1E, in some embodiments, the rotor assembly 101 is in a shape that is similar to a ring shape. For example, the rotor assembly 101 comprises a rotor assembly opening 107 (for example, located at the center of the rotor assembly opening 107) for securing the rotor assembly 101 to a shaft structure. As described above, the example rotary position sensor 100 may be configured to detect an object's angular movement and translate the object's angular mechanical position to one or more electrical signals. In some embodiments, the shaft structure that the rotor assembly opening 107 is secured to is the object whose angular movement is to be detected by the example rotary position sensor 100.

As an example, the example rotary position sensor 100 may be implemented to detect the rotary movement of a shaft of a motor. In such an example, the rotor assembly 101 is secured to the shaft of the motor. For example, the rotor assembly opening 107 may be in a circular shape, and the diameter of the rotor assembly opening 107 is the same as the diameter of the shaft of the motor. In some embodiments, the rotor assembly 101 is welded to the shaft of the motor at the rotor assembly opening 107. As such, because the rotor assembly 101 is secured to the shaft of the motor, the rotor assembly 101 rotates when the shaft of the motor rotates.

While the description above provides an example implementation of the example rotary position sensor 100, it is noted that the scope of the present disclosure is not limited to the description above. In some examples, an example rotary position sensor 100 may be implemented to detect the rotary position of other objects.

Referring back to the example shown in FIG. 1A to FIG. 1E, in some embodiments, the rotor assembly 101 comprises a rotor flange 127.

In some embodiments, the rotor flange 127 is in a ring shape. In some embodiments, the rotor flange 127 comprises a rotor flange opening (for example, located at the center of the rotor flange 127) that provides the rotor assembly opening 107. In some embodiments, the rotor flange 127 may comprise one or more materials such as, but not limited to, plastics. In some embodiments, the rotor flange 127 may comprise one or more materials other than plastic.

Referring back to FIG. 1A to FIG. 1E, in some embodiments, the rotor assembly 101 comprises a plurality of rotor plates (such as, but not limited to, rotor plate 119A and rotor plate 119B). In some embodiments, the plurality of rotor plates (such as, but not limited to, rotor plate 119A and rotor plate 119B) are disposed/secured on the rotor flange 127. For example, the plurality of rotor plates may be welded to the rotor flange 127. Additionally, or alternatively, the plurality of rotor plates may be glued to the rotor flange 127. Additionally, or alternatively, the plurality of rotor plates may be disposed/secured on the rotor flange 127 through other means.

In the example shown in FIG. 1B, the plurality of rotor plates (such as, but not limited to, rotor plate 119A and rotor plate 119B) are in an annular sector shape that is defined by at least an annular sector angle and the outer diameter and/or inner diameter of the rotor plates. For example, the plurality of rotor plates (such as, but not limited to, rotor plate 119A and rotor plate 119B) may be annular sector plates. In some embodiments, the plurality of rotor plates (such as, but not limited to, rotor plate 119A and rotor plate 119B) have the same size.

In some embodiments, the plurality of rotor plates (such as, but not limited to, rotor plate 119A and rotor plate 119B) are alternatingly positioned on the rotor assembly 101 such that they are not connected to one another.

In some embodiments, the plurality of rotor plates (such as, but not limited to, rotor plate 119A and rotor plate 119B) may provide technical benefits, improvements, and/or advantages such as, but not limited to, diverting magnetic flux between the plurality of cosine coil elements (such as, but not limited to, secondary coil element 115D and secondary coil element 115C) and the plurality of sine coil elements (such as, but not limited to, secondary coil element 115A and secondary coil element 115B) based on angular positions of the plurality of rotor plates.

For example, the plurality of rotor plates (such as, but not limited to, rotor plate 119A and rotor plate 119B) comprise material having a high magnetic permeability (e.g. the magnetic permeability of such material satisfies a magnetic permeability threshold). Examples of materials for rotor plates that have a magnetic permeability satisfying a magnetic permeability threshold include, but not limited to, Carpenter HyMu "80"® Alloy, Carpenter 49® Alloy, and/or the like. Similar to those described above, the magnetic permeability of a rotor plate indicates how easily an external magnetic field can induce an internal field in the rotor plate. In other words, the higher the magnetic permeability, the better the rotor plate at allowing magnetic flux to pass through it.

As described, the plurality of primary coil elements (such as, but not limited to, primary coil element 113A and primary coil element 113B) generates magnetic flux when the excitation voltage is applied to the plurality of primary coil elements. Further, as described above, the rotor assembly 101 is secured to a shaft structure (for example, the shaft of a motor). As the shaft structure rotates, the plurality of rotor plates (such as, but not limited to, primary coil element 113A and primary coil element 113B) rotate along with the shaft structure. In some embodiments, at least because the plurality of rotor plates comprise materials having high magnetic permeability, the rotation of the plurality of rotor plates affects the magnetic flux generated by the plurality of primary coil elements (such as, but not limited to, primary coil element 113A and primary coil element 113B). In some embodiments, at least because of the changes in the magnetic flux, the detection voltages generated by the plurality of secondary coil elements (such as, but not limited to, secondary coil element 115A, secondary coil element 115B, secondary coil element 115C, and secondary coil element 115D) change as well.

In some embodiments, as plurality of rotor plates (such as, but not limited to, primary coil element 113A and primary coil element 113B) rotate, the plurality of rotor plates may divert the magnetic flux between the plurality of cosine coil elements (such as, but not limited to, secondary coil element 115D and secondary coil element 115C) and the plurality of sine coil elements (such as, but not limited to, secondary coil element 115A and secondary coil element 115B) and cause changes in the detection voltages in the plurality of cosine coil elements and the plurality of sine coil elements.

In some embodiments, the rotor plate number associated with the plurality of rotor plates, the rotor sector angles of the rotor plates, the outer diameter and/or inner diameter of the plurality of the plurality of rotor plates may be configured or determined directly or indirectly based on output requirements of the example rotary position sensor 100, details of which are described herein.

In the examples shown in FIG. 1A to FIG. 1E, the rotor assembly 101 comprises at least two rotor plates (such as, but not limited to, rotor plate 119A and rotor plate 119B). As described above, the rotor assembly 101 may be secured to a rotating shaft of an application.

In the examples shown in FIG. 1A to FIG. 1E, the PCB assembly 105 comprises at least two primary coil elements (such as, but not limited to, primary coil element 113A and primary coil element 113B) printed on a first side of the PCB assembly 105 and at least four secondary coil elements (such as, but not limited to, secondary coil element 115A, secondary coil element 115B, secondary coil element 115C, and secondary coil element 115D) printed on a second side of the PCB assembly 105. In the examples shown in FIG. 1A to FIG. 1E, the stator assembly 103 comprises at least four stator plates (such as, but not limited to, stator plate 117A, stator plate 117B, stator plate 117C, and stator plate 117D). As described above, the PCB assembly 105 and/or the stator assembly 103 may be secured to a housing of the application, and the PCB assembly 105 and the stator assembly 103 may be secured to one another.

In some embodiments, during operation, the rotor assembly 101, the stator assembly 103, and the PCB assembly 105 may be aligned coaxially. For example, a center axis of the rotor assembly opening 107, a center axis of the stator assembly opening 109, and a center axis of the PCB assembly opening 111 may be aligned.

In the example shown in FIG. 1E, example parameters associated with the example rotary position sensor are illustrated. In some embodiments, the thickness of the rotor assembly 101 ($R_T$) may be 5.3 millimeters. The air gap between the rotor assembly 101 and the stator assembly 103 ($A_T$) may be 1 millimeters. The overall thickness of the PCB assembly 105 and the stator assembly 103 ($S_T$) may be 3.2 millimeters. The overall thickness of the rotor assembly 101, the air gap, the stator assembly 103, and the PCB assembly 105 ($O_T$) may be 9.5 millimeters. The inner diameter of the rotor assembly 101 (for example, the diameter of the rotor assembly opening 107) ($R_{ID}$) may be 6.25 millimeters. The outer diameter of the stator assembly 103 and/or the PCB assembly ($S_{OD}$) may be 22.9 millimeters.

While the description above provides some example parameters, it is noted that the scope of the present disclosure is not limited to the description above. In some examples, an example rotary position sensor may have other parameters.

As described above, the primary coil element number associated with the plurality of primary coil elements, the secondary coil element number associated with the plurality of secondary coil elements, the stator plate number associated with the plurality of stator plates, the stator sector angles of the plurality of stator plates, the outer diameter and/or inner diameter of the plurality of stator plates, the rotor plate number associated with the plurality of rotor plates, the rotor sector angles of the plurality of rotor plates, and/or the outer diameter and/or inner diameter of the plurality of rotor plates may be configured or determined directly or indirectly based on output requirements of the example rotary position sensor 100, details of which are described herein.

As described above, various embodiments of the present disclosure provide a configurable rotary position sensor. In some embodiments, the example rotary position sensor 100 may be configured to satisfy different output requirements for detecting rotary positions. For example, an example output requirement may require the example rotary position sensor 100 to provide quadrature sinusoidal outputs based on the detected rotary positions (e.g. the example rotary position sensor 100 functions as a resolver (e.g. a VR resolver)). As another example, an example output requirement may require the example rotary position sensor 100 to provide quadrant linear outputs based on the detected rotary positions (e.g. the example rotary position sensor 100 functions as a rotary variable differential transformer (RVDT)).

In some embodiments, to configure the example rotary position sensor 100 as a RVDT to provide quadrant linear outputs, the stator plate number associated with the plurality of stator plates equals four (4) and the rotor plate number associated with the plurality of rotor plates equals two (2). In other words, the example rotary position sensor 100 comprises four stator plates and two rotor plates.

In some embodiments, to configure the example rotary position sensor 100 as a RVDT to provide quadrant linear outputs, the primary coil element number associated with the plurality of primary coil elements equals two (2) and the secondary coil element number associated with the plurality of secondary coil elements equals four (4). In other words, the example rotary position sensor 100 comprises four secondary coil elements and two primary coil elements.

As such, an example method of manufacturing the example rotary position sensor 100 as a RVDT to provide quadrant linear outputs may comprise providing a PCB assembly 105, printing two primary coil elements on the first side of the PCB assembly 105, printing four secondary coil elements on the second side of PCB assembly 105, molding four stator plates in the stator shell 125 of the stator assembly 103, and welding two rotor plates on the rotor flange 127 of the rotor assembly 101.

In some embodiments, to detect the quadrant linear outputs from the example rotary position sensor 100 that functions as a RVDT, the plurality of secondary coil elements comprises a plurality of secondary coil A elements (such as, but not limited to, secondary coil element 115A or secondary coil element 115B) and a plurality of secondary coil B elements (such as, but not limited to, secondary coil element 115D or secondary coil element 115C). In some embodiments, each of the plurality of secondary coil A elements (such as, but not limited to, secondary coil element 115A or secondary coil element 115B) is positioned at a 90 degrees angle to one of the plurality of secondary coil B elements (such as, but not limited to, secondary coil element 115D or secondary coil element 115C) relative to a PCB assembly opening center of the PCB assembly opening.

In some embodiments, to detect the quadrant linear outputs from the example rotary position sensor 100 that functions as a RVDT, the example rotary position sensor 100 further comprises a differential voltage detecting element electronically coupled to one of the plurality of secondary coil A elements (such as, but not limited to, secondary coil element 115A or secondary coil element 115B) and one of the plurality of secondary coil B elements (such as, but not limited to, secondary coil element 115D or secondary coil element 115C).

In some embodiments, differential voltage detecting element is a voltage sensor that generates a differential voltage output indicating a voltage difference between the plurality of secondary coil A elements (such as, but not limited to, secondary coil element 115A and secondary coil element 115B) and the plurality of secondary coil B elements (such as, but not limited to, secondary coil element 115D and secondary coil element 115C).

For example, a first end of the differential voltage detecting element may be electrically coupled to a first end of the secondary coil element 115A, and a second end of the differential voltage detecting element may be electrically coupled to a first end of the secondary coil element 115C. As described above, the secondary coil element 115A may be electrically coupled to the secondary coil element 115B, and the secondary coil element 115C may be electrically coupled to the secondary coil element 115D. As such, the differential voltage detecting element may detect a differential voltage between the secondary coil A elements and the secondary coil B elements, indicating that the example rotary position sensor 100 can function as a RVDT to provide quadrant linear outputs.

In some embodiments, the plurality of secondary coil A elements (such as, but not limited to, secondary coil element 115A or secondary coil element 115B) are electrically coupled to the plurality of secondary coil B elements (such as, but not limited to, secondary coil element 115D or secondary coil element 115C) in series. In some embodiments, the plurality of secondary coil A elements (such as, but not limited to, secondary coil element 115A or secondary coil element 115B) are not electrically coupled to the plurality of secondary coil B elements (such as, but not limited to, secondary coil element 115D or secondary coil element 115C).

In some embodiments, when the example rotary position sensor 100 functions as a RVDT, the example rotary position sensor 100 may give an output that is roughly sinusoidal, but may have similarities to a triangle wave in that it has portions near the zero crossing which are roughly linear. As such, when the example rotary position sensor 100 functions as a RVDT, quadrant linear outputs are generated and the useful sensing range of the RVDT is limited to these linear portions.

In some embodiments, to configure the example rotary position sensor 100 as a resolver to provide quadrature sinusoidal outputs, the primary coil element number corresponds to a resolver speed of the example rotary position sensor 100 according to the output requirements.

In the present disclosure, the term "resolver speed" refers to the number of electrical cycle pairs generated from the secondary coil elements compared to the number of mechanical revolutions of the shaft structure (on which the rotor plates are secured to). In some embodiments, the resolver speed may be determined based on the particular application and/or the accuracy degree needed for the output. For example, in a single speed resolver, a single electrical cycle is generated for every mechanical revolution of the shaft structure. In a multi-speed resolver (for example, a 2× resolver, a 3× resolver, etc.), multiple sine cycles and cosine cycles are generated at every mechanical revolution of the shaft structure, therefore providing a higher degree of accuracy.

For example, for a 2× resolver, the primary coil element number associated with the plurality of primary coil elements equals two (2) (e.g. two primary coil elements are printed on the first side of the PCB assembly 105). For a 3× resolver, the primary coil element number associated with the plurality of primary coil elements equals three (3) (e.g. three primary coil elements are printed on the first side of the PCB assembly 105). For a 4× resolver, the primary coil element number associated with the plurality of primary coil elements equals four (4) (e.g. four primary coil elements are printed on the first side of the PCB assembly 105).

In some embodiments, a secondary coil element number associated with the plurality of secondary coil elements is twice the primary coil element number associated with the plurality of primary coil elements. In some embodiments, the secondary coil element number associated with the plurality of secondary coil elements is twice the resolver speed of the example rotary position sensor 100 according to the output requirements.

For example, for a 2× resolver, the secondary coil element number associated with the plurality of secondary coil elements equals four (4) (e.g. four secondary coil elements are printed on the second side of the PCB assembly 105). For a 3× resolver, the secondary coil element number associated with the plurality of secondary coil elements equals six (6) (e.g. six secondary coil elements are printed on the second side of the PCB assembly 105). For a 4× resolver, the secondary coil element number associated with the plurality of secondary coil elements equals eight (8) (e.g. eight secondary coil elements are printed on the second side of the PCB assembly 105).

In some embodiments, a stator plate number associated with the plurality of stator plates is the same as a secondary coil element number associated with the plurality of secondary coil elements. In some embodiments, a stator plate number associated with the plurality of stator plates is twice the resolver speed of the example rotary position sensor 100 according to the output requirements.

For example, for a 2× resolver, the stator plate number associated with the plurality of stator plates equals four (4) (e.g. four stator plates are molded in the stator shell 125 of the stator assembly 103). For a 3× resolver, the stator plate number associated with the plurality of stator plates equals six (6) (e.g. six stator plates are molded in the stator shell 125 of the stator assembly 103). For a 4× resolver, the stator plate number associated with the plurality of stator plates equals eight (8) (e.g. eight stator plates are molded in the stator shell 125 of the stator assembly 103).

In some embodiments, a rotor plate number associated with the plurality of rotor plates is half of a stator plate number associated with the plurality of stator plates. In some embodiments, the rotor plate number associated with the plurality of rotor plates is the same as the primary coil element number associated with the plurality of primary coil elements. In some embodiments, the rotor plate number associated with the plurality of rotor plates is the same as the resolver speed of the example rotary position sensor 100 according to the output requirements.

For example, for a 2× resolver, the rotor plate number associated with the plurality of rotor plates equals two (2) (e.g. two rotor plates are welded on the rotor flange 127 of the rotor assembly 101). For a 3× resolver, the rotor plate number associated with the plurality of rotor plates equals three (3) (e.g. three rotor plates are welded on the rotor flange 127 of the rotor assembly 101). For a 4× resolver, the rotor plate number associated with the plurality of rotor plates equals four (4) (e.g. four rotor plates are welded on the rotor flange 127 of the rotor assembly 101).

In some embodiments, a stator sector angle of each of the plurality of stator plates is based on the stator plate number. For example, as described above, the stator assembly is in a shape that is similar to a ring shape, therefore providing a 360 degrees angle. The stator sector angle of each of the plurality of stator plates may be calculated based on dividing the 360 degrees angle by the stator plate number (and minus the angle of gaps between stator plates, if needed). For example, if the stator plate number is four and the angle of gaps between stator plates is two, the stator sector angle may be calculated based on (360/4)−2=88 degrees.

In some embodiments, the outer diameter and/or inner diameter of the plurality of stator plates may be based on the stator plate number. For example, as the stator plate number increases, the outer diameter and the inner diameter of the plurality of stator plates may increase proportionally to accommodate higher speed resolvers (for example, 3× and more).

In some embodiments, a rotor sector angle of each of the plurality of rotor plates is based on the rotor plate number. For example, as described above, the rotor assembly is in a shape that is similar to a ring shape, therefore providing a 360 degrees angle. The rotor sector angle of each of the plurality of rotor plates may be calculated based on dividing the 360 degrees angle by twice the rotor plate number. For example, if the rotor plate number is two, the rotor sector angle may be calculated based on (360/4)=90 degrees.

As described above, the rotor plates are alternatingly positioned on the rotor flange 127 of the rotor assembly 101 such that they are not connected with one another. In some embodiments, the angle of a gap between two edges of neighboring rotor plates may be the same as the rotor sector angle.

In some embodiments, the outer diameter and/or inner diameter of the plurality of rotor plates may be based on the rotor plate number. For example, as the rotor plate number increases, the outer diameter and the inner diameter of the plurality of rotor plates may increase proportionally to accommodate higher speed resolvers (for example, 3× and more).

As such, an example method of manufacturing the example rotary position sensor 100 as a resolver to provide quadrature sinusoidal outputs may comprise providing a PCB assembly 105, determining a primary coil element number associated with the plurality of primary coil element according to a resolver speed of the example rotary position sensor 100 based on the output requirements; printing primary coil elements on the first side of the PCB assembly 105; determining a secondary coil element number associated with the plurality of secondary coil elements as twice the primary coil element number associated with the plurality of primary coil elements; printing secondary coil elements on the second side of PCB assembly 105; determining a stator plate number associated with the plurality of stator plates as the same as the secondary coil element number associated with the plurality of secondary coil elements; molding stator plates in the stator shell 125 of the stator assembly 103; determining a rotor plate number associated with the plurality of rotor plates as half of the stator plate number associated with the plurality of stator plates, and welding rotor plates on the rotor flange 127 of the rotor assembly 101.

In some embodiments, to detect the quadrature sinusoidal outputs from the example rotary position sensor 100 that functions as a resolver, the example rotary position sensor 100 comprises a sine voltage detecting element and a cosine voltage detecting element. In some embodiments, the sine voltage detecting element and cosine voltage detecting element are voltage sensors.

In some embodiments, the sine voltage detecting element is electronically coupled to the plurality of sine coil elements (such as, but not limited to, secondary coil element 115A and secondary coil element 115B). In some embodiments, the sine voltage detecting element generates a sine voltage output indicating a sine voltage of plurality of sine coil elements (such as, but not limited to, secondary coil element 115A and secondary coil element 115B).

In some embodiments, the cosine voltage detecting element is electronically coupled to the plurality of cosine coil elements (such as, but not limited to, secondary coil element 115D and secondary coil element 115C). In some embodiments, the cosine voltage detecting element generates a cosine voltage output indicating a cosine voltage of plurality of cosine coil elements (such as, but not limited to, secondary coil element 115D and secondary coil element 115C).

As such, the sine voltage detecting element may detect a sine voltage from the sine coil elements, and the cosine voltage detecting element may detect a cosine voltage from the cosine coil elements, indicating that the example rotary position sensor 100 can function as a resolver to provide quadrature sinusoidal outputs.

As such, various embodiments of the present disclosure may provide a configurable rotary position sensor that provide quadrature sinusoidal outputs as a resolver and/or quadrant linear outputs as a RVDT based at least in part on the number of primary coil elements, the number of secondary coil elements, the number of stator plates, and the number of rotor plates of the configurable rotary position sensor.

Figure 2A:
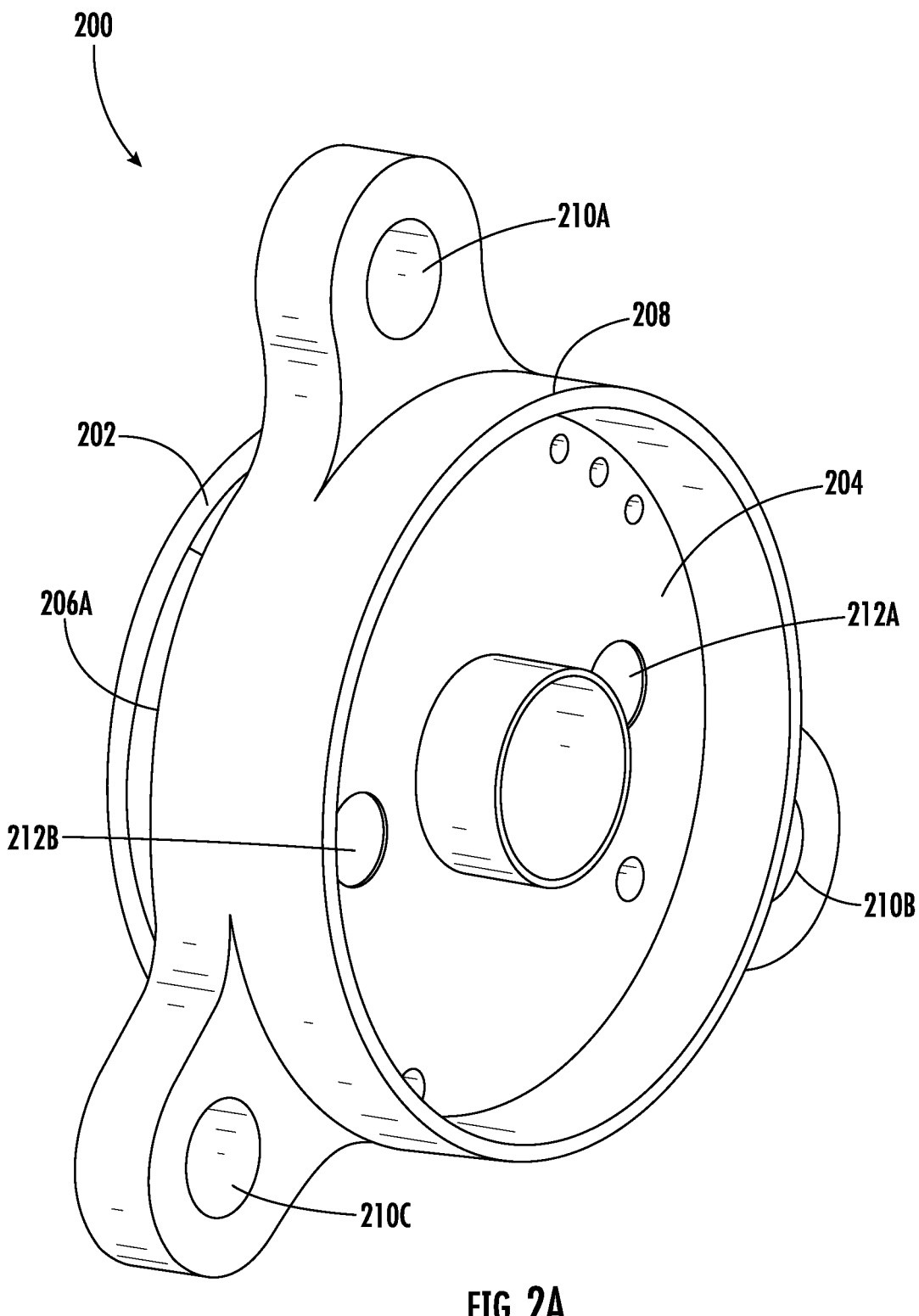
FIG. 2A illustrates an example perspective view of an example rotary position sensor in accordance with some example embodiments described herein.
Figure 2B:
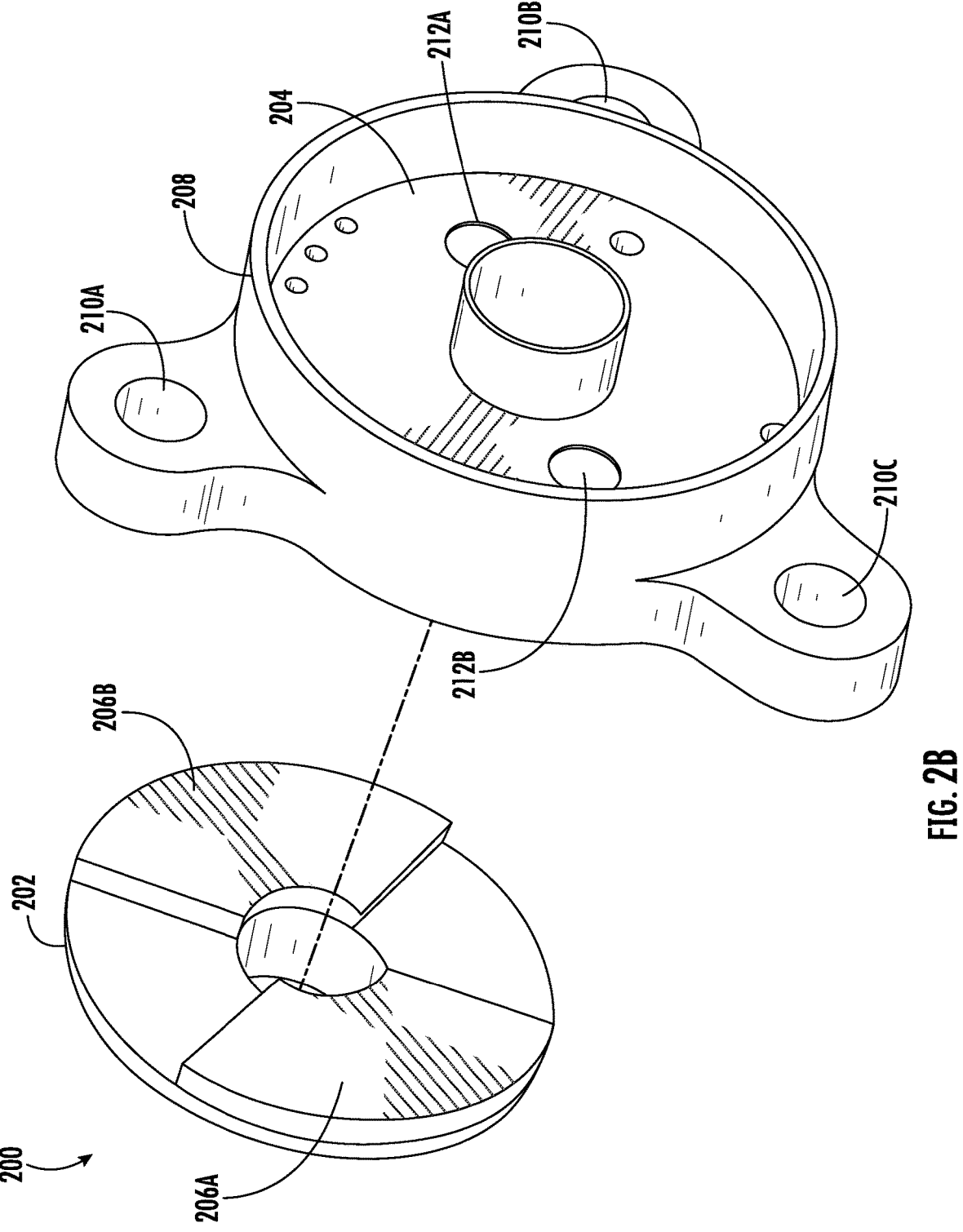
FIG. 2B illustrates an example of an exploded view of the example rotary position sensor shown in FIG. 2A in accordance with some example embodiments described herein.

Referring now to FIG. 2A and FIG. 2B, example views of an example rotary position sensor 200 in accordance with some example embodiments described herein are illustrated. In particular, FIG. 2A illustrates an example perspective view of the example rotary position sensor 200. FIG. 2B illustrates an example of an exploded view of the example rotary position sensor 200 shown in FIG. 2A.

In the example shown in FIG. 2A and FIG. 2B, the example rotary position sensor 200 comprises a rotor assembly 202 and a PCB assembly 204, similar to the rotor assembly 101 and the PCB assembly 105, respectively, described above in connection with at least FIG. 1A to FIG. 1E.

In some embodiments, the example rotary position sensor 200 comprises a plurality of primary coil elements such as, but not limited to, primary coil element 212A and primary coil element 212B, similar to the primary coil element 113A and primary coil element 113B described above in connection with at least FIG. 1A to FIG. 1E.

In some embodiments, the example rotary position sensor 200 comprises a plurality of rotor plates such as, but not limited to, rotor plate 206A and rotor plate 206B, similar to the rotor plate 119A and rotor plate 119B described above in connection with at least FIG. 1A to FIG. 1E.

In the example shown in FIG. 2A and FIG. 2B, the example rotary position sensor 200 further comprises an enclosure 208. In particular, the enclosure 208 may be in a shape that is similar to a ring shape. In some embodiments, the inner periphery of the enclosure 208 may be secured/attached to an outer periphery of the PCB assembly 204, such that the PCB assembly 204 is secured within the enclosure 208.

In some embodiments, the enclosure 208 may comprise one or more ear elements (such as ear element 210A, ear element 210B, and ear element 210C as shown in FIG. 2A and FIG. 2B). In some embodiments, the one or more ear elements are attached/secured to an outer periphery of the enclosure 208, and each of the one or more ear elements (such as ear element 210A, ear element 210B, and ear element 210C as shown in FIG. 2A and FIG. 2B) may comprise a through hole so that, for example, the enclosure 208 and the PCB assembly 204 can be secured to a housing of a device through the through holes.

Figure 3:
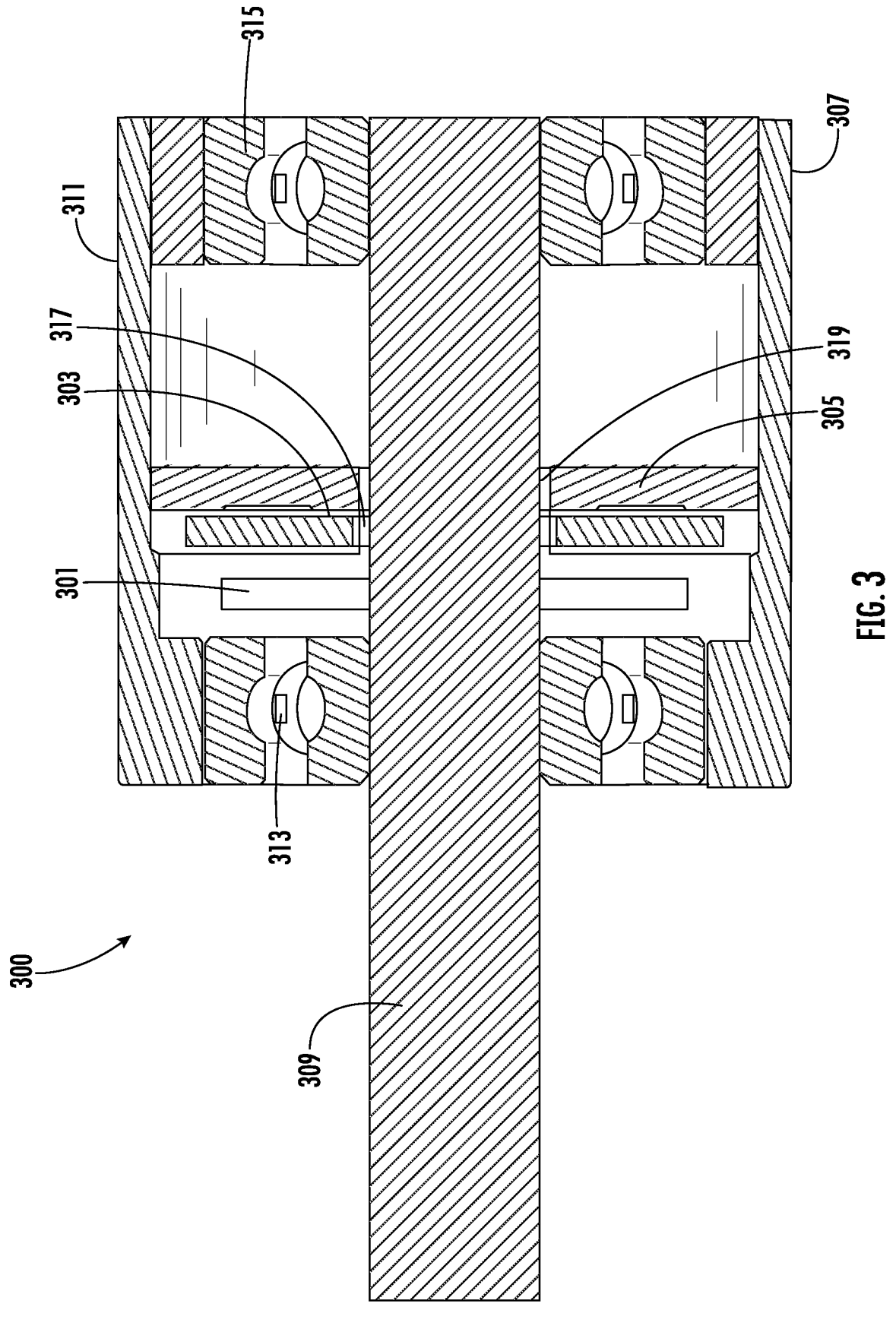
FIG. 3 illustrates an example cross-sectional view of an example rotary position sensor in accordance with some example embodiments described herein.

Referring now to FIG. 3, an example cross-sectional view of an example rotary position sensor 300 in accordance with some example embodiments described herein is illustrated.

In some embodiments, the example rotary position sensor 300 comprises a rotor assembly 301, a stator assembly 303, and a PCB assembly 305, similar to the rotor assembly 101, the stator assembly 103, and the PCB assembly 105, respective described above in connection with at least FIG. 1A to FIG. 1E.

In the example shown in FIG. 3 the example rotary position sensor 300 is configured to detect the rotary position of the shaft structure 309 of the device 307. The device 307 comprises a housing 311 that is supported by at least the front bearing 313 and the rear bearing 315.

As shown in FIG. 3, the stator assembly 303, and the PCB assembly 305 are secured to the housing 311. The stator assembly comprises a stator assembly opening 317 for receiving the shaft structure 309, and the PCB assembly 305 comprises a PCB assembly opening 319 for receiving the shaft structure 309. The shaft structure 309 may rotate without causing any rotational movement of the stator assembly 303 or the PCB assembly 305.

Further, as shown in FIG. 3, the rotor assembly 301 is welded to the shaft structure 309 of the device 307, and therefore the rotational movement of the shaft structure 309 is transferred to the rotor assembly 301.

As shown in FIG. 3, the rotor assembly 301, the stator assembly 303, and the PCB assembly 305 are aligned coaxially around the shaft structure 309 of the device 307.

Figure 4:
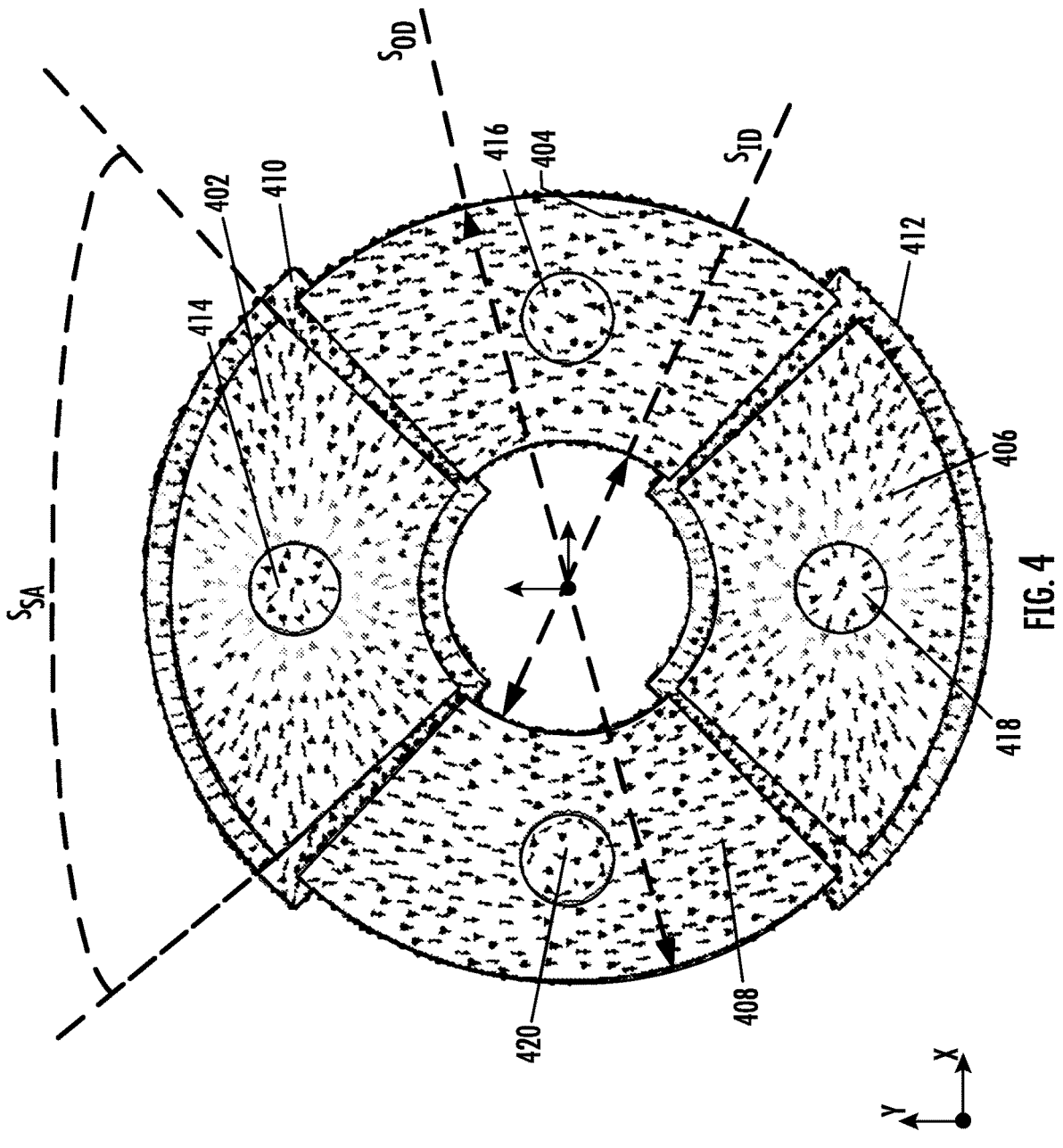
FIG. 4 is an example magnetic flux plot diagram of at least a portion of an example rotary position sensor in accordance with some example embodiments described herein.
Figure 5:
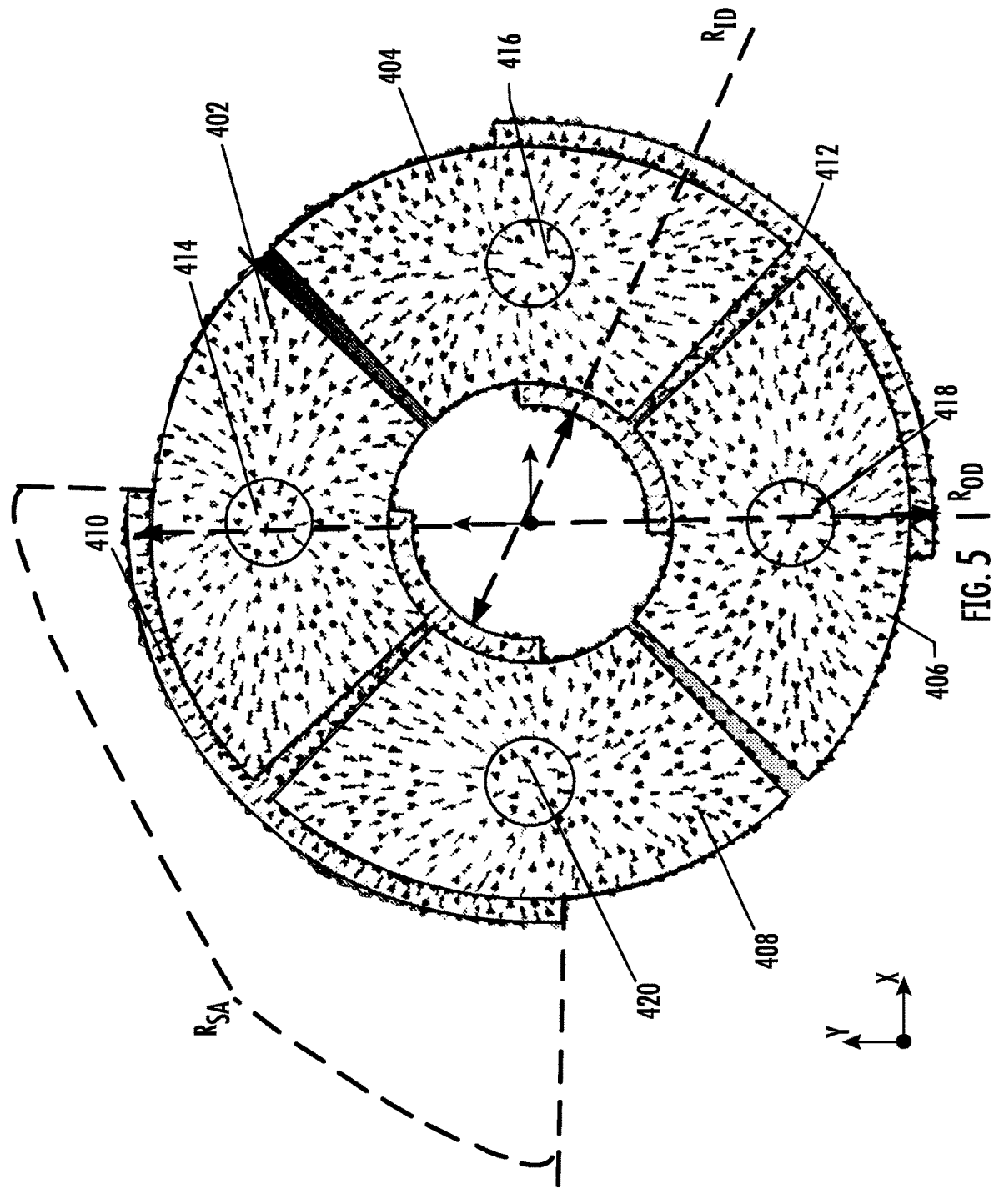
FIG. 5 is an example magnetic flux plot diagram of at least a portion of an example rotary position sensor in accordance with some example embodiments described herein.

Referring now to FIG. 4 and FIG. 5, example magnetic flux plot diagrams associated with example rotary position sensors in accordance with some example embodiments described herein are illustrated. In particular, FIG. 4 and FIG. 5 illustrate example magnetic flux plot diagrams of at least a portion of example rotary position sensors, where the rotor plates are at different positions relative to the stator plates.

In particular, FIG. 4 illustrates the magnetic flux plot of stator plates 402, 404, 406, and 408, where at least some of the stator plates (e.g. the stator plates 402 and 406) overlap with the rotator plates 410 and 412, while some of the stator plates (e.g. the stator plates 404 and 408) do not overlap with the rotator plates 410 and 412. FIG. 5 illustrates the magnetic flux plot of stator plates 402, 404, 406, and 408, where the rotator plates 410 and 412 have rotated to a different angle as compared to that in FIG. 4.

As shown in FIG. 4 and FIG. 5, the magnetic flux generated by the primary coil elements links the stator plates 402, 404, 406, 408 and rotator plates 410, 412 axially due to their high magnetic permeability and their coaxial position. As such, various embodiments of the present disclosure enable axial magnetic flux to be distributed when detecting rotary positions.

Additionally, shown from FIG. 4 to FIG. 5, the rotary position changes of the rotator plates 410, 412 cause the magnetic flux detected by the secondary coil elements 414, 416, 418, and 420 to change, and the secondary coil elements 414, 416, 418, and 420 may generate output signals that are correlated to the rotary position changes, similar to those described above.

Further, FIG. 4 and FIG. 5 illustrate various example parameters described herein. In FIG. 4, $S_{SA}$ illustrates an example stator sector angle of the stator plates, $S_{OD}$ illustrates an example outer diameter of the stator plates, and the $S_{ID}$ illustrates an example inner diameter of the stator plates. In FIG. 5, $R_{SA}$ illustrates an example rotor sector angle of the rotor plates, $R_{OD}$ illustrates an example outer diameter of the rotor plates, and the $R_{ID}$ illustrates an example inner diameter of the rotor plates.

Figure 6:
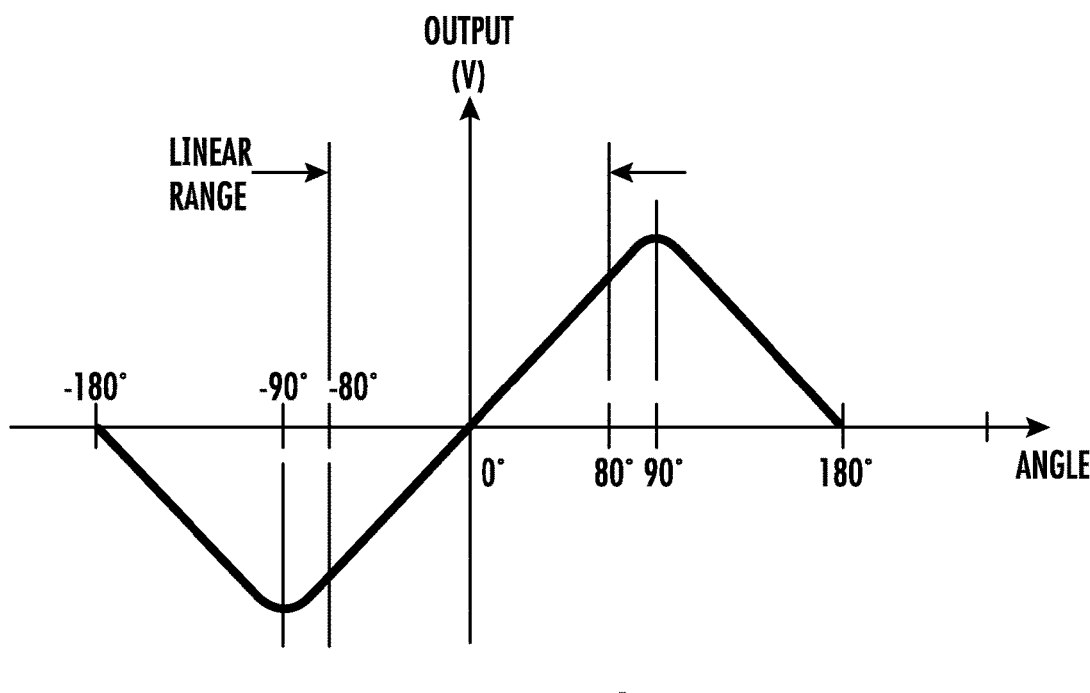
FIG. 6 illustrates an example output diagram indicating example output signals from an example rotary position sensor in accordance with some example embodiments described herein.
Figure 7:
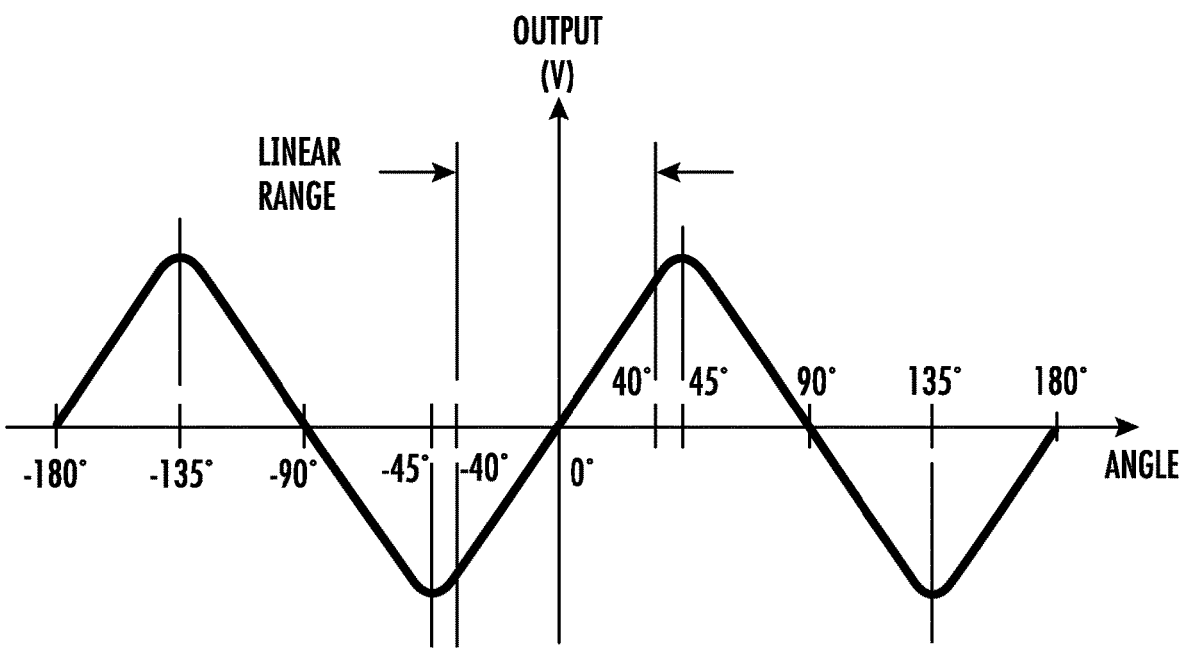
FIG. 7 illustrates an example output diagram indicating example output signals from an example rotary position sensor in accordance with some example embodiments described herein.

Referring now to FIG. 6 and FIG. 7, example output diagrams indicating example output signals from example rotary position sensors in accordance with some example embodiments described herein are illustrated.

In particular, the example output signals from the example output diagrams shown in FIG. 6 and FIG. 7 are from example rotary position sensors that are configured as RVDTs in accordance with various embodiments of the present disclosure. FIG. 6 illustrates example outputs from an example rotary position sensor as a single cycle RVDT, and FIG. 7 illustrates example outputs from an example rotary position sensor as a dual cycle RVDT. As shown in FIG. 6 and FIG. 7, the rotary position may be determined based on the differential voltages generated by the secondary coil elements due to the rotary position.

As described above, there are many technical challenges and difficulties associated with RVDTs, and example embodiments of the present disclosure overcome these technical challenges and difficulties.

For example, many RVDTs require four poles in the stator design and create limitations on slot opening for placing coils. In contrast, various embodiments of the present disclosure may overcome these technical challenges and difficulties. For example, in some embodiments, there are no poles as the coil elements are printed to the PCB assembly.

As another example, many RVDTs require eight coils to work magnetically. In contrast, various embodiments of the present disclosure may overcome these technical challenges and difficulties. For example, in some embodiments, only two primary coil elements necessary and four secondary coil elements are necessary.

As another example, it can be difficult to terminate lead wires in many RVDTs because of the large number of coils. In contrast, various embodiments of the present disclosure may overcome these technical challenges and difficulties. For example, in some embodiments, lead wires (that connect the primary coil elements and secondary coil elements) are directly soldered to the PCB assembly.

As another example, it can be difficult to insert coils in many RVDTs because of small slot openings (e.g. a diameter of 0.018 centimeter). Only one turn at a time can be moved inside the slot, and it is a time consuming process and requires highly skilled people to complete such a process. In contrast, various embodiments of the present disclosure may overcome these technical challenges and difficulties. For example, in some embodiments, there is no stator core in the stator assembly.

As another example, many RVDTs have a high manufacturing cost due to the process time and material needed (for example, $300 per stator and $80 per rotor). In contrast, various embodiments of the present disclosure may overcome these technical challenges and difficulties. For example, in some embodiments, the cost for manufacturing a stator assembly may be lower than $15, and the cost for manufacturing a rotor assembly may be lower than $10.

As another example, many RVDTs have high chances of damaging magnet wire because it has to pass through a small slot. In contrast, various embodiments of the present disclosure may overcome these technical challenges and difficulties. For example, in some embodiments, there is no magnet wire as the primary coil elements and the secondary coil elements are directly printed on the PCB assembly.

As another example, many RVDTs have a length of 1.1", limiting its applicability. In contrast, various embodiments of the present disclosure may overcome these technical challenges and difficulties. For example, in some embodiments, the length of the rotary position sensor is 0.75" (therefore reducing the length by 31.8%).

Figure 8:
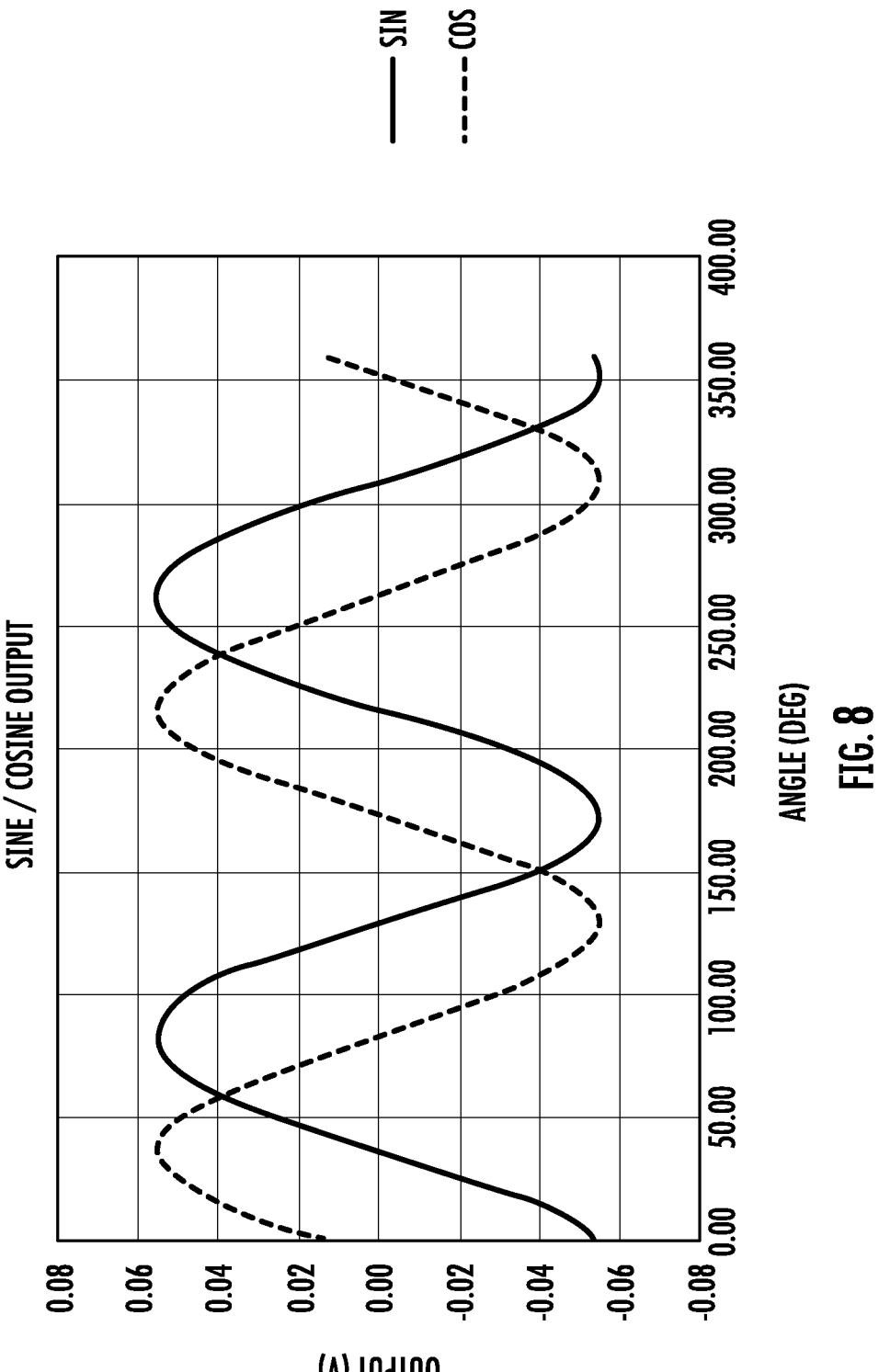
FIG. 8 illustrates an example output diagram indicating example output signals from an example rotary position sensor in accordance with some example embodiments described herein.
Figure 9:
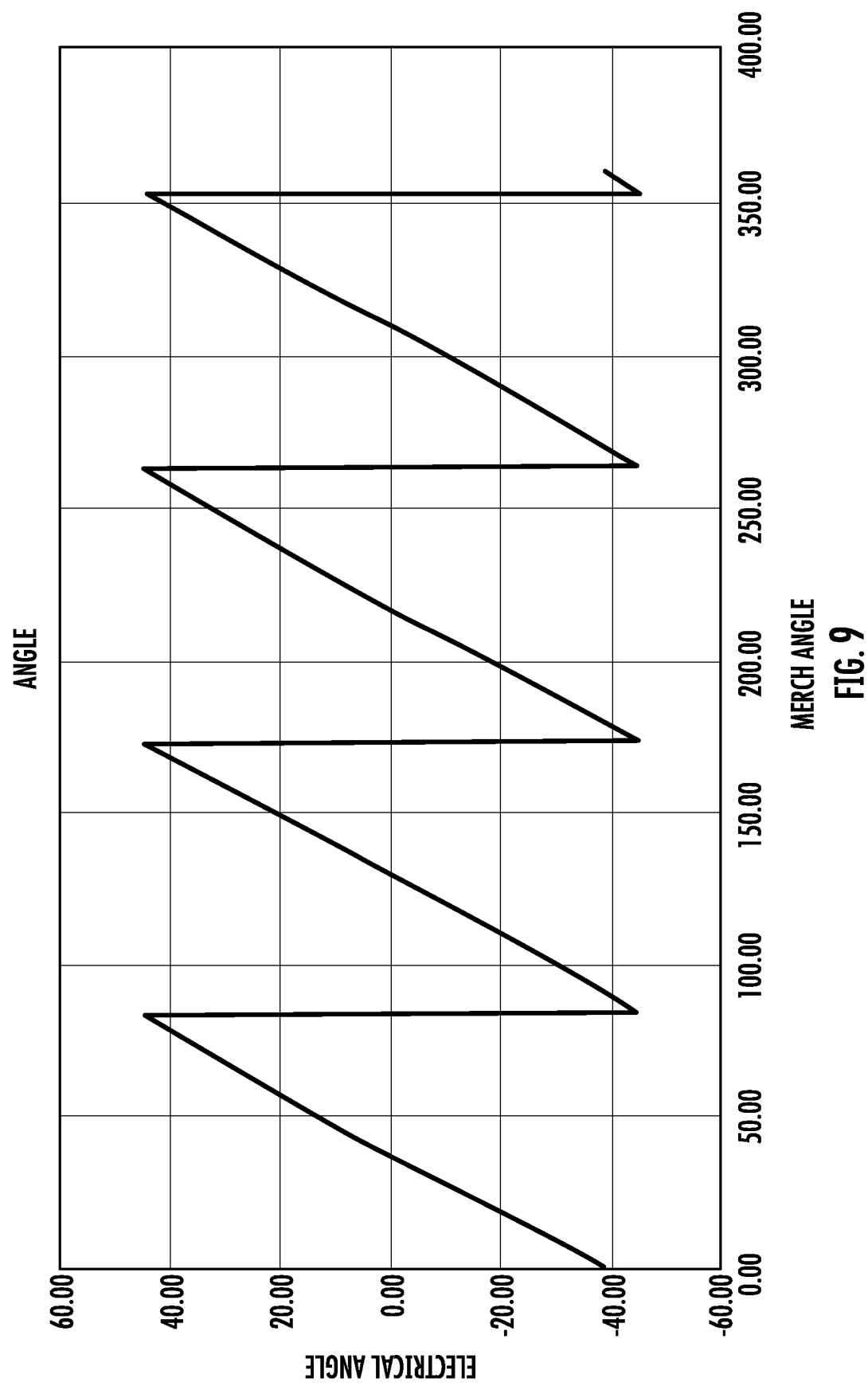
FIG. 9 illustrates an example angle diagram based on example output signals from an example rotary position sensor in accordance with some example embodiments described herein.
Figure 10:
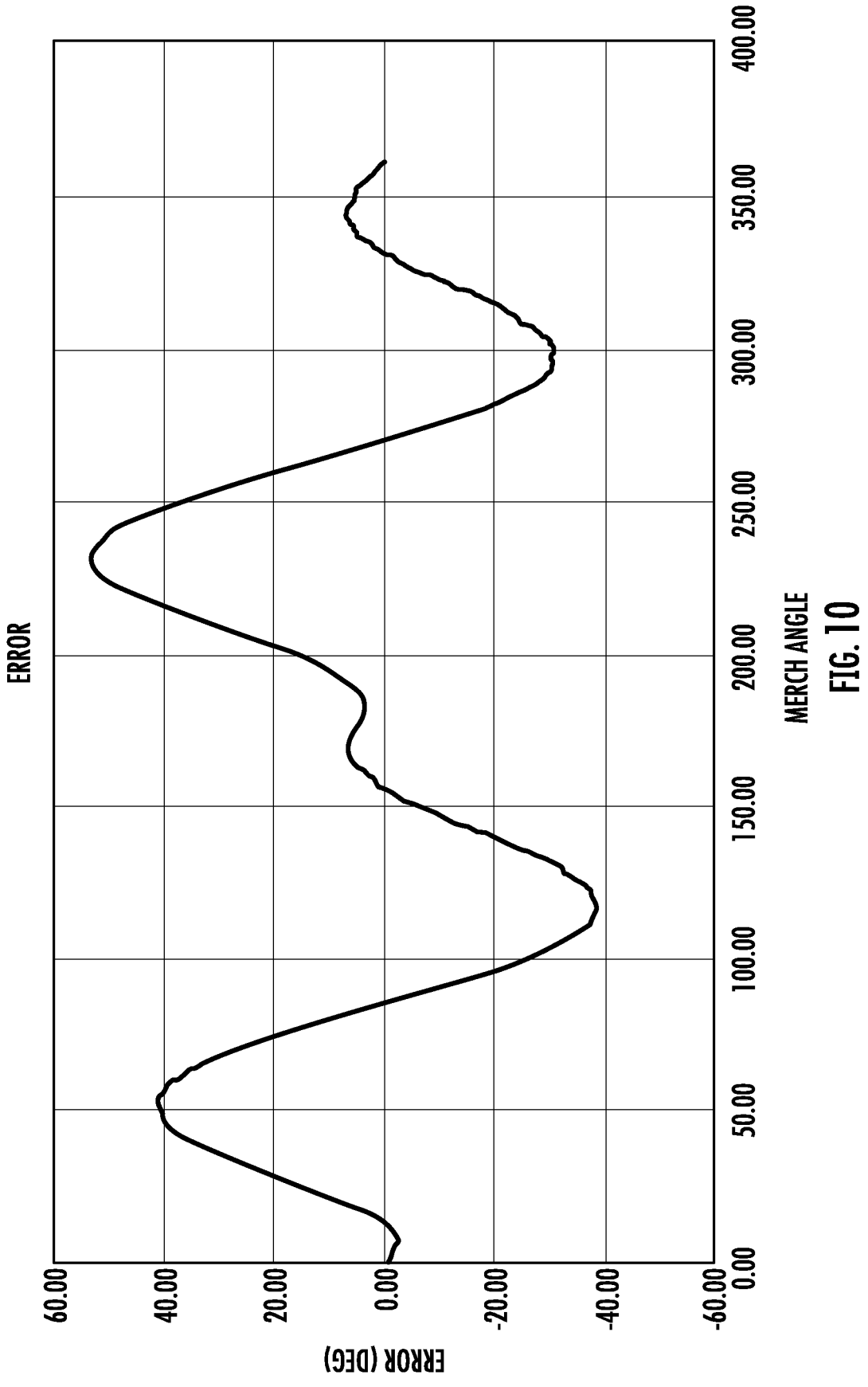
FIG. 10 illustrates an example error diagram based on example output signals from an example rotary position sensor in accordance with some example embodiments described herein.

Referring now to FIG. 8, FIG. 9, and FIG. 10, example diagrams based on example output signals from example rotary position sensors in accordance with some example embodiments described herein are illustrated.

In particular, FIG. 8 illustrates an example output diagram indicating example output signals from an example rotary position sensor that is configured as a resolver in accordance with some example embodiments described herein. FIG. 9 illustrates an example angle diagram based on example output signals from an example rotary position sensor that is configured as a resolver in accordance with some example embodiments described herein. FIG. 10 illustrates an example error diagram based on example output signals from an example rotary position sensor that is configured as a resolver in accordance with some example embodiments described herein.

For example, the sine output and the cosine output shown in FIG. 8 may be generated by sine coil elements and cosine coil elements, respectively. Based on the difference between the sine output and the cosine output, the rotary position of the shaft structure (for example, the rotational angle of the shaft structure) may be determined, as shown in FIG. 9. As shown in FIG. 10, the accuracy errors in relation to the rotary position of the shaft structure (for example, the rotational angle of the shaft structure) may also be determined based on the sine outputs and the cosine outputs.

As described above, there are many technical challenges and difficulties associated with resolvers, and example embodiments of the present disclosure overcome these technical challenges and difficulties.

For example, it can be difficult to wind on all the slots with manual or semi-auto methods in many resolvers. In contrast, various embodiments of the present disclosure may overcome these technical challenges and difficulties. For example, in some embodiments, the primary coil elements and secondary coil elements are directly printed on the PCB assembly.

As another example, it can be difficult to terminate lead wire in many resolvers because of the high number of coils. In contrast, various embodiments of the present disclosure may overcome these technical challenges and difficulties. For example, in some embodiments, lead wires (that connect the primary coil elements and secondary coil elements) are directly soldered to the PCB assembly.

As another example, it can be difficult to insert coils in many resolvers because of small slots in stator poles. It is a time consuming process and requires highly skilled people to complete the process. In contrast, various embodiments of the present disclosure may overcome these technical challenges and difficulties. For example, in some embodiments, there is no stator core in the stator assembly.

As another example, many resolvers have a high manufacturing cost due to the material cost and process cost (for example, starting at approximately $30). In contrast, various embodiments of the present disclosure may overcome these technical challenges and difficulties. For example, in some embodiments, the manufacturing cost of the stator cost can be less than $25.

As another example, chances of damaging magnet wire is high in many resolvers because it has to pass from a small slot. In contrast, various embodiments of the present disclosure may overcome these technical challenges and difficulties. For example, in some embodiments, there is no magnet wire as the primary coil elements and secondary coil elements are directly printed on the PCB assembly.

As such, various embodiments of the present disclosure provide an example rotary position sensor that provides various technical benefits and advantages. For example, various embodiments of the present disclosure provide a single design/solution that can provide quadrature sinusoidal outputs as a resolver and/or quadrant linear outputs as a rotary variable differential transformer (RVDT) by changing for example, the rotor/stator assembly geometry, the placement and numbers of primary coil elements and secondary coil elements. In some embodiments, there are no laminations needed for the rotor assembly and the stator assembly (which have magnetic permeability), thereby reducing cost and providing simplicity. In some embodiments, there are no physical poles, which provides simplicity and avoids expensive manufacturing processes. In some embodiments, the primary coil elements and the secondary coil elements are printed on PCB assembly, while handling of coils in many RVDTs and VR resolvers required skilled labor and process cost. In some embodiments, there are not many coils and coil ends for soldering in examples of the present disclosure in comparison with many RVDTs and VR resolvers that require skilled labor and incur process cost to solder coils and coil ends. In some embodiments, the primary coil elements and the secondary coil elements are printed on PCB assembly with an automated process so as to reduce cost. As described above, soldering lead wire to coil and binding lead wires are tedious processes that require skilled labor and process cost; in contrast, examples of the present disclosure may solder lead wires directly to the PCB assembly pins to provide a low cost of manufacturing.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A rotary position sensor comprising:
a rotor assembly comprising a rotor assembly opening for securing the rotor assembly to a shaft structure;
a stator assembly comprising a stator assembly opening for receiving the shaft structure; and
a base assembly secured to the stator assembly, wherein the base assembly comprises a plurality of primary coil elements printed on a first side of the base assembly and a plurality of secondary coil elements printed on a second side of the base assembly,
wherein radiuses of the plurality of primary coil elements are different,
wherein the rotor assembly comprises a plurality of rotor plates,
wherein the plurality of rotor plates are in an annular sector shape and have same size,
wherein the plurality of rotor plates are alternatingly positioned on the rotor assembly such that the plurality of rotor plates are not connected to one another,
wherein a rotor sector angle of each of the plurality of rotor plates is based on a rotor plate number such that the rotor sector angle equals 360 degrees divided by twice the rotor plate number, and
wherein the plurality of rotor plates comprise material having magnetic permeability.

2. The rotary position sensor of claim 1, wherein the base assembly is a printed circuit board (PCB) assembly, wherein the PCB assembly comprises a PCB assembly opening, wherein the PCB assembly opening is aligned with the stator assembly opening.

3. The rotary position sensor of claim 2, wherein the PCB assembly comprises at least two primary coil elements printed on a first side of the PCB assembly and at least four secondary coil elements printed on a second side of the PCB assembly.

4. The rotary position sensor of claim 2, wherein the plurality of primary coil elements are positioned radially away from the PCB assembly opening on the first side of the PCB assembly.

5. The rotary position sensor of claim 2, wherein a plurality of distances between a primary coil element center of each of the plurality of primary coil elements and a PCB assembly opening center of the PCB assembly opening are the same.

6. The rotary position sensor of claim 2, wherein the plurality of primary coil elements are distributed equally along a distribution circumference on the PCB assembly.

7. The rotary position sensor of claim 2, wherein the plurality of secondary coil elements comprises a plurality of secondary coil A elements and a plurality of secondary coil B elements, wherein each of the plurality of secondary coil A elements is positioned at a 90 degrees angle to one of the plurality of secondary coil B elements relative to a PCB assembly opening center of the PCB assembly opening, wherein the rotary position sensor further comprises:
a differential voltage detecting element electronically coupled to one of the plurality of secondary coil A elements and one of the plurality of secondary coil B elements to generate a differential voltage output indicating a voltage difference between the plurality of secondary coil A elements and the plurality of secondary coil B elements.

8. The rotary position sensor of claim 2, wherein the plurality of secondary coil elements comprises a plurality of sine coil elements and a plurality of cosine coil elements.

9. The rotary position sensor of claim 8, wherein each of the plurality of sine coil elements is positioned at a 90 degrees angle to one of the plurality of cosine coil elements relative to a PCB assembly opening center of the PCB assembly opening.

10. The rotary position sensor of claim 8, wherein the plurality of sine coil elements are electrically connected in series, wherein the plurality of cosine coil elements are electrically connected in series.

11. The rotary position sensor of claim 10, further comprising:
a sine voltage detecting element electronically coupled to the plurality of sine coil elements to generate a sine voltage output indicating a sine voltage of plurality of sine coil elements; and
a cosine voltage detecting element electronically coupled to the plurality of cosine coil elements to generate a cosine voltage output indicating a cosine voltage of plurality of cosine coil elements.

12. The rotary position sensor of claim 2, wherein the plurality of secondary coil elements are positioned radially away from the PCB assembly opening on the second side of the PCB assembly.

13. The rotary position sensor of claim 2, wherein a plurality of distances between a secondary coil element center of each of the plurality of secondary coil elements and a PCB assembly opening center of the PCB assembly opening are the same.

14. The rotary position sensor of claim 2, wherein the plurality of secondary coil elements are distributed equally along a distribution circumference on the PCB assembly.

15. The rotary position sensor of claim 1, wherein a secondary coil element number associated with the plurality of secondary coil elements is twice a primary coil element number associated with the plurality of primary coil elements.

16. The rotary position sensor of claim 15, wherein the primary coil element number corresponds to a resolver speed of the rotary position sensor.

17. The rotary position sensor of claim 1, wherein the stator assembly comprises a plurality of stator plates.

18. The rotary position sensor of claim 17, wherein a stator plate number associated with the plurality of stator plates is the same as a secondary coil element number associated with the plurality of secondary coil elements.

19. The rotary position sensor of claim 17, wherein a rotor plate number associated with the plurality of rotor plates is half of a stator plate number associated with the plurality of stator plates.

20. The rotary position sensor of claim 19, wherein the stator assembly comprises at least four stator plates, wherein the rotor assembly comprises at least two rotor plates.

* * * * *